(12) United States Patent
Kawabata

(10) Patent No.: US 7,936,095 B2
(45) Date of Patent: May 3, 2011

(54) COMMUNICATION SYSTEM USING DIRECTIONAL CONTROL OF ELECTOMAGNETIC WAVE POWER TRANSMISSION

(75) Inventor: Minoru Kawabata, Osaka (JP)

(73) Assignee: PANASONIC, Corporation, Osaka (JP)

( * ) Notice: Subject to any disclaimer, the term of this patent is extended or adjusted under 35 U.S.C. 154(b) by 168 days.

(21) Appl. No.: 12/160,122

(22) PCT Filed: Mar. 27, 2007

(86) PCT No.: PCT/JP2007/056284
§ 371 (c)(1),
(2), (4) Date: Jul. 7, 2008

(87) PCT Pub. No.: WO2007/111322
PCT Pub. Date: Oct. 4, 2007

(65) Prior Publication Data
US 2009/0146503 A1   Jun. 11, 2009

(30) Foreign Application Priority Data

Mar. 29, 2006   (JP) .................................. 2006-090274

(51) Int. Cl.
*H02J 7/00* (2006.01)
*H04B 5/00* (2006.01)
(52) U.S. Cl. ....................................................... 307/326
(58) Field of Classification Search .................. 307/103, 307/326; 710/303
See application file for complete search history.

(56) References Cited

U.S. PATENT DOCUMENTS 3,434,678 A * 3/1969 Heenan et al. ............. 244/158.1
3,989,994 A * 11/1976 Brown ........................... 322/2 R
4,697,761 A * 10/1987 Long ................................. 244/62
4,837,576 A * 6/1989 Schwarz .......................... 342/77

(Continued)

FOREIGN PATENT DOCUMENTS

JP          58-42323          3/1983

(Continued)

OTHER PUBLICATIONS

English language Abstract of JP 2003-47177, Feb. 14, 2003.

(Continued)

*Primary Examiner* — Jared J Fureman
*Assistant Examiner* — Adi Amrany
(74) *Attorney, Agent, or Firm* — Greenblum & Bernstein, P.L.C.

(57) ABSTRACT

When a certain period of time has elapsed since a direction retrieval unit received a control signal from an appliance controller, the direction retrieval unit instructs the microwave transmitter to transmit microwaves, and then instructs the microwave transmitter to perform scanning of the microwaves. When a notification signal receiver receives a notification signal from a remote controller, the direction retrieval unit instructs the microwave transmitter to stop the scanning of the microwaves. After this, the direction retrieval unit instructs a power controller to raise a power level of the microwaves. The direction retrieval unit determines whether or not the notification signal receiver receives from the notification signal transmitter of the remote controller at regular time intervals charging-in-progress signals indicating that charging is in progress and whether or not the notification signal receiver receives from the notification signal transmitter a charging-complete signal indicating that the charging is completed.

11 Claims, 20 Drawing Sheets

U.S. PATENT DOCUMENTS

| | | | |
|---|---|---|---|
| 5,019,768 A * | 5/1991 | Criswell et al. | 322/2 R |
| 5,068,669 A * | 11/1991 | Koert et al. | 343/700 MS |
| 5,218,374 A * | 6/1993 | Koert et al. | 343/789 |
| 5,503,350 A | 4/1996 | Foote | 244/1 R |
| 5,570,102 A * | 10/1996 | Kochiyama et al. | 343/880 |
| 5,666,127 A * | 9/1997 | Kochiyama et al. | 343/853 |
| 5,685,505 A * | 11/1997 | Meckler | 244/169 |
| 6,087,985 A * | 7/2000 | Rummeli et al. | 342/359 |
| 6,087,991 A * | 7/2000 | Kustas | 343/700 MS |
| 6,919,847 B2 * | 7/2005 | Caplan et al. | 343/705 |
| 7,068,991 B2 * | 6/2006 | Parise | 455/343.1 |
| 2003/0161261 A1* | 8/2003 | Weis | 370/221 |
| 2004/0142733 A1* | 7/2004 | Parise | 455/572 |
| 2006/0113955 A1* | 6/2006 | Nunally | 320/108 |
| 2006/0184705 A1* | 8/2006 | Nakajima | 710/303 |
| 2007/0230423 A1 | 10/2007 | Yoshida et al. | |
| 2007/0274226 A1* | 11/2007 | Tillotson | 370/252 |
| 2008/0026753 A1 | 1/2008 | Okinoi et al. | |
| 2008/0125049 A1 | 5/2008 | Suzuki et al. | |
| 2008/0170566 A1 | 7/2008 | Akimoto | |
| 2008/0231685 A1 | 9/2008 | Hattori | |
| 2008/0272889 A1* | 11/2008 | Symons | 340/10.1 |
| 2008/0312852 A1* | 12/2008 | Maack | 702/63 |

FOREIGN PATENT DOCUMENTS

| | | |
|---|---|---|
| JP | 58-87430 | 6/1983 |
| JP | 61-89746 | 5/1986 |
| JP | 63-36616 | 2/1988 |
| JP | 64-5296 | 1/1989 |
| JP | 3-207953 | 9/1991 |
| JP | 4-94874 | 8/1992 |
| JP | 4-269094 | 9/1992 |
| JP | 5-76088 | 3/1993 |
| JP | 6-105381 | 4/1994 |
| JP | 6-169492 | 6/1994 |
| JP | 8-130840 | 5/1996 |
| JP | 11-18162 | 1/1999 |
| JP | 2003-47177 | 2/2003 |
| JP | 2004-120641 | 4/2004 |
| JP | 2005-276719 | 10/2005 |

OTHER PUBLICATIONS

English language Abstract of JP 8-130840, May 21, 1996.
English language Abstract of JP 6-105381, Apr. 15, 1994.
English language Abstract of JP 6-169492, Jun. 14, 1994.
English language Abstract of JP 2004-120641, Apr. 15, 2004.
English language Abstract of JP 58-42323, Mar. 11, 1983.
English language Abstract of JP 63-36616, Feb. 17, 1988.
English language Abstract of JP 64-5296, Jan. 10, 1989.
English language Abstract of JP 3-207953, Sep. 11, 1991.
English language Abstract of JP 4-269094, Sep. 25, 1992.
English language Abstract of JP 5-76088, Mar. 26, 1993.
English language Abstract of JP 11-18162, Jan. 22, 1999.
English language Abstract of JP 2005-276719, Oct. 6, 2005.

* cited by examiner

COMMUNICATION SYSTEM USING DIRECTIONAL CONTROL OF ELECTOMAGNETIC WAVE POWER TRANSMISSION

TECHNICAL FIELD

The present invention relates to a communication system including an electronic appliance and a portable communication device that communicates with the electronic appliance.

BACKGROUND ART

Conventionally, portable communication devices that communicate with electronic appliances have been used. For example, remote control devices (remote controllers) have been used to remotely operate various types of electronic appliances (controlled appliances).

Power required for using the remote control devices has been supplied by dry cells that are housed in the remote control devices.

However, users must replace the dry cells on a regular basis. In addition, discarding the replaced dry cells without separation leads serious environmental problems because dry cells include hazardous substances.

Therefore, it is proposed to provide rechargeable cells in the remote control devices in order to eliminate time and labor of replacing the dry cells and to prevent in advance the environmental problems to be created (see Patent Document 1, for example). The above-mentioned rechargeable cells supply power to each component in the remote control devices.

The foregoing remote control device is provided with a connector, which comes into contact with charging electrodes to cause the rechargeable cell to be charged. Note that the charging electrodes are provided at a side of a television receiver (a television main body), and disposed in a holder that holds the remote control device.

[Patent Document 1] JP 06-169492 A

DISCLOSURE OF THE INVENTION

Problems to be Solved by the Invention

In the conventional technique, however, a remote control device is required to always be held in a holder when charging a rechargeable cell of the remote control device. This takes time and labor for users.

An object of the present invention is to provide a communication system that is easy for users to use.

Means for Solving the Problems (1) A communication system according to an aspect of the present invention includes an electronic appliance and a portable communication device that communicates with the electronic appliance, wherein the electronic appliance includes a first communication unit that communicates with the portable communication device, a direction detector that detects a direction in which the portable communication device exists, and an electromagnetic wave transmitter that converts power supplied from a power supply into electromagnetic waves while transmitting the converted electromagnetic waves in the direction detected by the direction detector, the portable communication device includes a second communication unit that communicates with the electronic appliance, a secondary cell that supplies power to the second communication unit, an electromagnetic wave receiver that receives the electromagnetic waves transmitted by the electromagnetic wave transmitter, a power converter that converts the electromagnetic waves received by the electromagnetic wave receiver into power, and a charger that charges the secondary cell using the power converted by the power converter.

In the communication system, communication is established between the first communication unit of the electronic appliance and the second communication unit of the portable communication device.

The direction in which the portable communication device exists is detected by the direction detector in the electronic appliance. The electromagnetic wave transmitter causes the power supplied from the power supply to be converted into the electromagnetic waves and causes the converted electromagnetic waves to be transmitted to the direction detected by the direction detector.

Meanwhile, the electromagnetic waves transmitted by the electromagnetic wave transmitter of the electronic appliance are received by the electromagnetic wave receiver in the portable communication device. The electromagnetic waves received by the electromagnetic wave receiver are converted into the power by the power converter. The secondary cell is charged by the charger using the power converted by the power converter. The power charged to the secondary cell is supplied to the second communication unit.

As described above, the direction in which the portable communication device exists is detected and the electromagnetic waves are transmitted by the electromagnetic wave transmitter of the electronic appliance toward the detected direction in which the portable communication device exists, and the secondary cell is then charged using the power generated by the electromagnetic waves in the portable communication device in the communication system according to the present invention. This eliminates necessity for users to place the portable communication device in a fixed position such as a holder (charging device). Accordingly, it does not take time and labor for users to charge the secondary cell of the portable communication device. This causes the portable communication device to be easily used by users.

(2) The portable communication device may further include a notification signal transmitter that transmits, when the electromagnetic waves are received by the electromagnetic wave receiver, to the electronic appliance a notification signal indicating that the electromagnetic waves are received, the electronic appliance may further include a notification signal receiver that receives the notification signal transmitted by the notification signal transmitter, the electromagnetic wave transmitter may include a directional antenna that radiates electromagnetic waves having directivity, and a scanning unit that performs two-dimensional scanning of the electromagnetic waves, radiated by the directional antenna, having directivity, and the direction detector may control the scanning unit to perform the two-dimensional scanning of the electromagnetic waves having directivity while stopping the scanning by the scanning unit when the notification signal is received by the notification signal receiver.

In this case, the direction detector controls the scanning unit to perform the two-dimensional scanning of the electromagnetic waves, radiated by the directional antenna, having directivity. Then, when the foregoing electromagnetic waves are received by the electromagnetic wave receiver in the portable communication device, the notification signal indicating that the electromagnetic waves are received is transmitted to the electronic appliance by the notification signal transmitter.

The notification signal transmitted by the notification signal transmitter of the portable communication device is received by the notification signal receiver of the electronic appliance. After this, the direction detector controls the scanning unit to stop the scanning of the electromagnetic waves.

As described above, the notification signal indicating that the electromagnetic waves are received from the electronic appliance is transmitted to the electronic appliance by the notification signal transmitter, so that existence of the portable communication device and the direction in which the portable communication device exists can be easily recognized.

In addition, the scanning of the electromagnetic waves by the scanning unit is stopped after the notification signal is received, so that the electromagnetic waves can be transmitted toward the portable communication device without unnecessary scanning by the scanning unit.

Furthermore, the electromagnetic waves having directivity are intensively transmitted to the portable communication device, so that power can be efficiently transmitted through weak electromagnetic waves. This prevents effects of the electromagnetic waves on the surrounding environment while reducing power consumption.

(3) The portable communication device may further include a notification signal transmitter that transmits a notification signal for detecting the direction in which the portable communication device exists, the electronic appliance may further include a notification signal receiver that receives the notification signal transmitted by the notification signal transmitter, the electromagnetic wave transmitter may include a directional antenna that radiates electromagnetic waves having directivity and a scanning unit that performs two-dimensional scanning of the electromagnetic waves, radiated by the directional antenna, having directivity, and the direction detector may detect the direction in which the portable communication device exists based on the notification signal received by the notification signal receiver and control the scanning unit to direct the electromagnetic waves, radiated by the directional antenna, having directivity to the detected direction.

In this case, the notification signal for detecting the direction in which the portable communication device exists is transmitted to the electronic appliance by the notification signal transmitter. The notification signal transmitted by the notification signal transmitter is received by the notification signal receiver of the electronic appliance.

After this, the direction in which the portable communication device exists is detected by the direction detector based on the notification signal received by the notification signal receiver. Then, the direction detector controls the scanning unit to direct the electromagnetic waves, radiated by the directional antenna, having directivity to the foregoing detected direction in which the portable communication device exists.

As described above, the notification signal indicating the direction in which the portable communication device exists is transmitted to the electronic appliance by the notification signal transmitter, so that the existence of the portable communication device and the direction in which the portable communication device exists can be easily recognized.

In addition, after the notification signal is received, the direction in which the electromagnetic waves are radiated by the directional antenna of the scanning unit is directed to the above-described direction in which the portable communication device exists, so that the electromagnetic waves can be transmitted toward the portable communication device without unnecessary scanning by the scanning unit.

Furthermore, the electromagnetic waves having directivity are intensively transmitted to the portable communication device, so that the power can be efficiently transmitted through weak electromagnetic waves. This prevents the effects of the electromagnetic waves on the surrounding environment while reducing the power consumption.

(4) The notification signal transmitter may transmit to the electronic appliance a signal indicating that charging is completed when the charging by the charger is completed, and the electromagnetic wave transmitter finishes transmission of the electromagnetic waves when the signal indicating that the charging is completed is received by the notification signal receiver.

In this case, when the charging is completed by the charger in the portable communication device, the signal indicating that the charging is completed is transmitted to the electronic appliance by the notification signal transmitter. Then, when the foregoing signal indicating that the charging is completed is received by the notification signal receiver in the electronic appliance, the transmission of the electromagnetic waves by the electromagnetic wave transmitter is finished. Such a configuration prevents unnecessary transmission of the electromagnetic waves and further reduces the power consumption.

(5) The notification signal transmitter may transmit to the electronic appliance a signal indicating that the charging is in progress when the charging by the charger is in progress, and the direction detector may again detect the direction in which the portable communication device exists when the signal indicating that the charging is in progress is not received by the notification signal receiver before the signal indicating that the charging is completed is received by the notification signal receiver.

In this case, the signal indicating that the charging is in progress is transmitted to the electronic appliance by the notification signal transmitter when the charging by the charger is in progress in the portable communication device. Then, when the signal indicating that the charging is in progress is not received by the notification signal receiver before the signal indicating that the charging is completed is received by the notification signal receiver in the electronic appliance, the direction in which the portable communication device exists is again detected by the direction detector.

By such a configuration, the direction in which the portable communication device exists is again detected even in a case where the portable communication device is moved by a user, so that the electromagnetic waves are transmitted in the direction in which the portable communication device, having been moved, exists. This allows the secondary cell of the portable communication device to be continuously charged.

(6) The electromagnetic wave transmitter and the notification signal receiver may include a common antenna. In this case, cost reduction and space saving can be achieved.

(7) The second communication unit of the portable communication device may include an operation signal generator that generates an operation signal for operating the electronic appliance based on an operation by a user, and an operation signal transmitter that transmits to the electronic appliance the operation signal generated by the operation signal generator, the first communication unit of the electronic appliance may include an operation signal receiver that receives the operation signal transmitted from the operation signal transmitter, and the electromagnetic wave transmitter may start transmission of the electromagnetic waves after a certain period of time has elapsed since the operation signal receiver finished receiving the operation signal.

In this case, the operation signal for operating the electronic appliance based on the operation by the user is generated by the operation signal generator, and the operation signal generated by the operation signal generator is transmitted to the electronic appliance by the operation signal transmitter. The operation signal transmitted from the operation signal transmitter is received by the operation signal receiver.

After a certain period of time elapses since the operation signal receiver has finished receiving the operation signal, the transmission of the electromagnetic waves is started by the electromagnetic wave transmitter.

As described above, when a certain period of time has elapsed, it is assumed that the user is away from the portable communication device, and the transmission of the electromagnetic waves to the portable communication device is thus started. This prevents the effects of the electromagnetic waves on a human body and a decrease in transmission efficiency of the electromagnetic waves.

(8) The electronic appliance may further include a storage that stores the direction, detected by the direction detector, in which the portable communication device exists, and the electromagnetic wave transmitter may transmit the electromagnetic waves in the direction, stored in the storage, in which the portable communication device exists.

In this case, the direction, detected by the direction detector, in which the portable communication device exists is stored in the storage. Then, the electromagnetic waves are transmitted by the electromagnetic wave transmitter in the direction, stored in the storage, in which the portable communication device exists.

Here, the portable communication devices are set at fixed positions such as a holder in many cases, depending on their kinds and applications.

In the present invention, the direction, detected by the direction detector, in which the portable communication device exists is stored in the storage, thereby eliminating a process of again detecting the direction in which the portable communication device exists in the next electromagnetic wave transmission.

(9) The portable communication device may further include an instruction unit that instructs to store the direction in which the portable communication device exists, the second communication unit may transmit to the electronic appliance an instruction signal indicating an instruction by the instruction unit, and the storage may store, when the instruction signal is received by the first communication unit, the direction, detected by the direction detector, in which the portable communication device exists.

In this case, the instruction unit instructs to store the direction in which the portable communication device exists. The instruction signal indicating the foregoing instruction by the instruction unit is transmitted to the electronic appliance by the second communication unit. Then, when the foregoing instruction signal is received by the first communication unit, the direction, detected by the direction detector, in which the portable communication device exists is stored by the storage. Such a configuration allows the user to use the instruction unit when the user desires to store in the storage the direction in which the portable communication device exists. This improves convenience of the portable communication device.

(10) The electromagnetic waves may have a frequency of 1 GHz to 30 GHz and a wavelength of 1 cm to 10 cm. In this case, the power can be efficiently transmitted from the electronic appliance to the portable communication device through the electromagnetic waves of a microwave band.

Effects of the Invention

According to a communication system of the present invention, users are not required to place a portable communication device in a fixed position such as a holder (charging device). This eliminates time and labor for users to charge a secondary cell of the portable communication device. As a result, the portable communication device is easy for users to use.

BEST MODE FOR CARRYING OUT THE INVENTION

Figure 1:
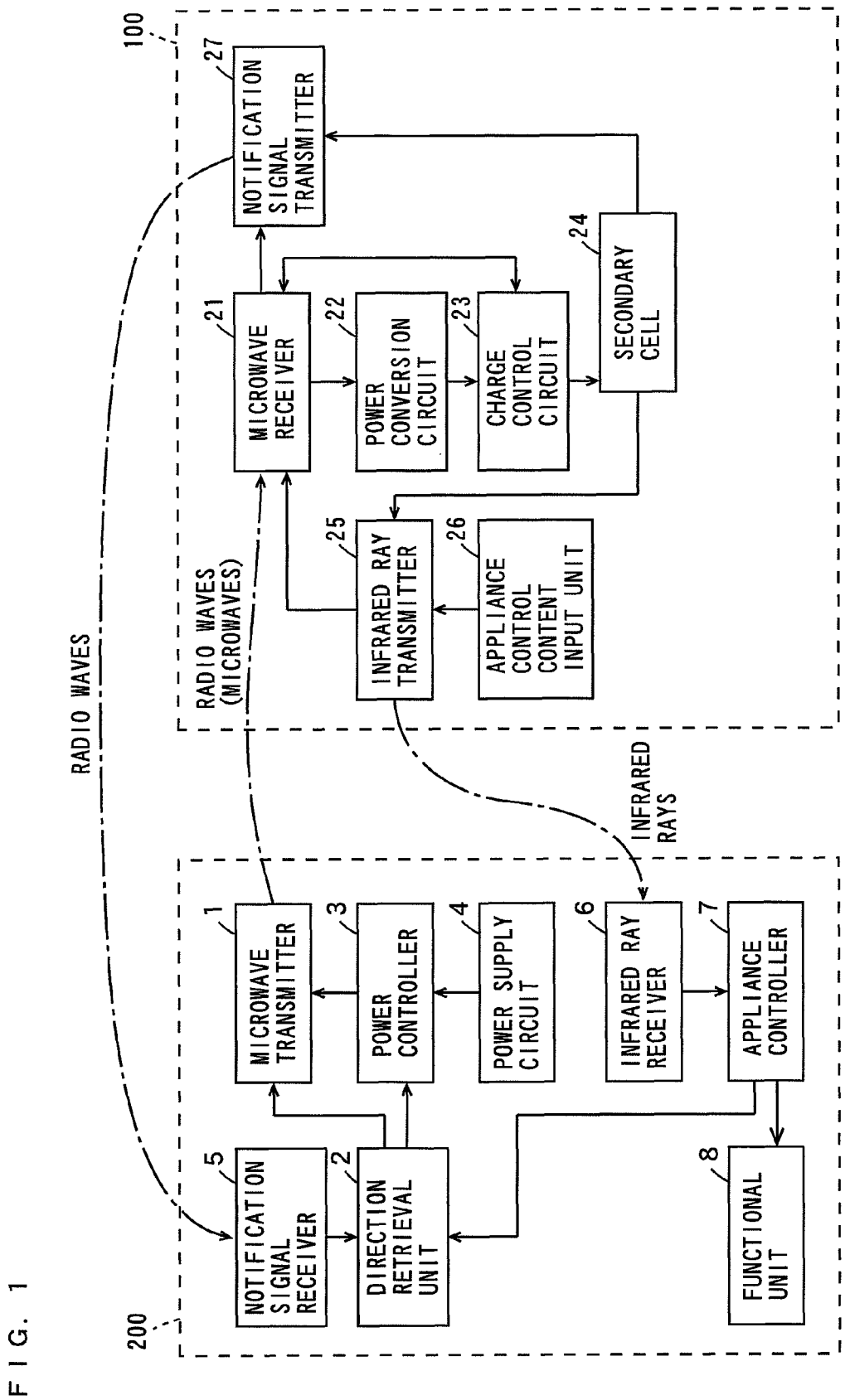
FIG. 1 is a block diagram showing configurations of a remote control device and a television receiver that is remotely operated by the remote control device according to a first embodiment.

The embodiments of the present invention will be described in detail referring to the drawings. The embodiments below describe a remote control system as an example of a communication system.

In the following embodiments, description is made of a case where a television receiver as an example of a controlled appliance is remotely operated by a remote control device.

(1) First Embodiment

(1-1) Configurations of the Remote Control Device and the Television Receiver Hereinafter, functions (operations) of respective components of the remote control device and the television receiver will be schematically explained. Details of the function of each component mentioned above will be described later using flowcharts.

FIG. 1 is a block diagram showing configurations of the remote control device and the television receiver, which is remotely operated by the remote control device, according to a first embodiment.

As shown in FIG. 1, the remote control device (hereinafter referred to as the remote controller) 100 includes a microwave receiver 21, a power conversion circuit 22, a charge control circuit 23, a secondary cell 24, an infrared ray transmitter 25, an appliance control content input unit 26 and a notification signal transmitter 27.

The television receiver 200 includes a microwave transmitter 1, a direction retrieval unit 2, a power controller 3, a power supply circuit 4, a notification signal receiver 5, an infrared ray receiver 6, an appliance controller 7 and a functional unit 8. Note that the power supply circuit 4 is connected to a commercial power supply.

The microwave transmitter 1 of the television receiver 200 includes a directional antenna and a transmitting circuit. The microwave receiver 21 of the remote controller 100 includes a non-directional antenna and a receiving circuit.

The notification signal transmitter 27 of the remote controller 100 includes a non-directional antenna and a modulator. The notification signal receiver 5 of the television receiver 200 includes a non-directional antenna and a demodulator.

The infrared ray transmitter 25 of the remote controller 100 includes an infrared ray emitting element and a modulator, and the infrared ray receiver 6 of the television receiver 200 includes an infrared ray receiving element and a demodulator.

The appliance control content input unit 26 of the remote controller 100 includes various kinds of keys (a storage key and the like) that users press.

Note that the functional unit 8 of the television receiver 200 includes a broadcasting receiving function, a selecting function, a demodulating function, a decoding function of a video signal and an audio signal, a video displaying function, an audio outputting function and the like which are generally used.

As an outline, the television receiver 200 firstly retrieves a direction in which the remote controller 100 exists in the present embodiment. Note that the direction in which the remote controller 100 exists indicates a relative direction of the remote controller 100 with the television receiver 200 as a positional reference in the following description.

After retrieving the direction in which the remote controller 100 exists, the television receiver 200 transmits microwaves toward the direction in which the remote controller 100 exists. The remote controller 100 converts the received microwaves into power, and charges itself using the converted power.

Here, the microwaves mean electromagnetic waves having a frequency of about 1 GHz to 30 GHz and a wavelength of about 1 cm to 10 cm.

Hereinafter, the functions of the respective components of the remote controller 100 and the television receiver 200 are described, followed by description of a flow of the processes with reference to flowcharts.

The power controller 3 applies power supplied from the power supply circuit 4 to the microwave transmitter 1. The microwave transmitter 1 converts the applied power into microwaves, and transmits the microwaves to the remote controller 100. Note that transmission of the microwaves is referred to as power transmission.

In addition, the microwave transmitter 1 scans a two-dimensional space by microwaves having strong directivity based on a command from the direction retrieval unit 2, thereby retrieving the direction in which the remote controller 100 exists.

The microwave receiver 21 of the remote controller 100 receives the microwaves transmitted by the microwave transmitter 1.

When the microwave receiver 21 receives the microwaves, it causes the notification signal transmitter 27 to transmit to the television receiver 200 a notification signal indicating that the microwave has been received.

The notification signal receiver 5 of the television receiver 200 receives the notification signal from the notification signal transmitter 27 while applying to the direction retrieval unit 2 a control signal indicating that it has received the notification signal.

The direction retrieval unit 2 receives the above-mentioned control signal from the notification signal receiver 5, and then commands the power controller 3 to raise the power of the microwaves to such a level that charging can be performed.

The power controller 3 raises the power of the microwaves to such a level that the charging can be performed, and the microwave transmitter 1 transmits the microwaves at a high power level to the remote controller 100.

The microwave receiver 21 of the remote controller 100 applies the received microwaves at the high power level to the power conversion circuit 22.

In addition, the microwave receiver 21 causes the notification signal transmitter 27 to transmit to the television receiver 200 a charging-start signal indicating that the charging is started and then to transmit at regular time intervals charging-in-progress signals indicating that the charging is in progress.

The power conversion circuit 22 converts the applied microwaves into power. The power conversion circuit 22 then applies the converted power to the charge control circuit 23.

The charge control circuit 23 charges the secondary cell 24 using the applied power. In addition, the charge control circuit 23 applies to the microwave receiver 21 a charging-complete signal indicating that the charging is completed when the charging of the secondary cell 24 is completed. Then, the microwave receiver 21 causes the notification signal transmitter 27 to transmit to the television receiver 200 the charging-complete signal indicating that the charging of the secondary cell 24 is completed.

The secondary cell 24 stores the power while applying the stored power to each component of the remote controller 100.

When any of the various kinds of keys of the appliance control content input unit 26 is pressed by a user, the appliance control content input unit 26 applies to the infrared ray transmitter 25 a control signal corresponding to the key that is pressed by the user.

The infrared ray transmitter 25 modulates the applied control signal while multiplexing the modulated signal on infrared carrier waves to transmit it to the television receiver 200.

The infrared ray receiver 6 of the television receiver 200 receives the modulated signal transmitted from the infrared ray transmitter 25 of the remote controller 100 while demodulating the received modulated signal into a control signal. Then, the infrared ray receiver 6 applies the control signal to the appliance controller 7.

The appliance controller 7 controls the above-mentioned functions of the functional unit 8 based on the control signal applied by the infrared ray receiver 6.

As described above, since the microwave transmitter 1 of the television receiver 200 includes the directional antenna, the power can be efficiently transmitted to the remote controller 100 by narrowing the transmission direction of the microwaves using the directional antenna in the present embodiment.

While the microwave receiver 21 and the notification signal transmitter 27 are separately provided in FIG. 1, the present invention is not limited to this and a configuration in which the non-directional antenna of the microwave receiver 21 and the non-directional antenna of the notification signal transmitter 27 are provided in common may be employed. In this case, the notification signal is transmitted from the notification signal transmitter 27 through the microwaves.

(1-2) Configuration of the Microwave Transmitter

Next, a configuration of the microwave transmitter 1 and a method for perform scanning of the microwaves are explained.

Figure 2:
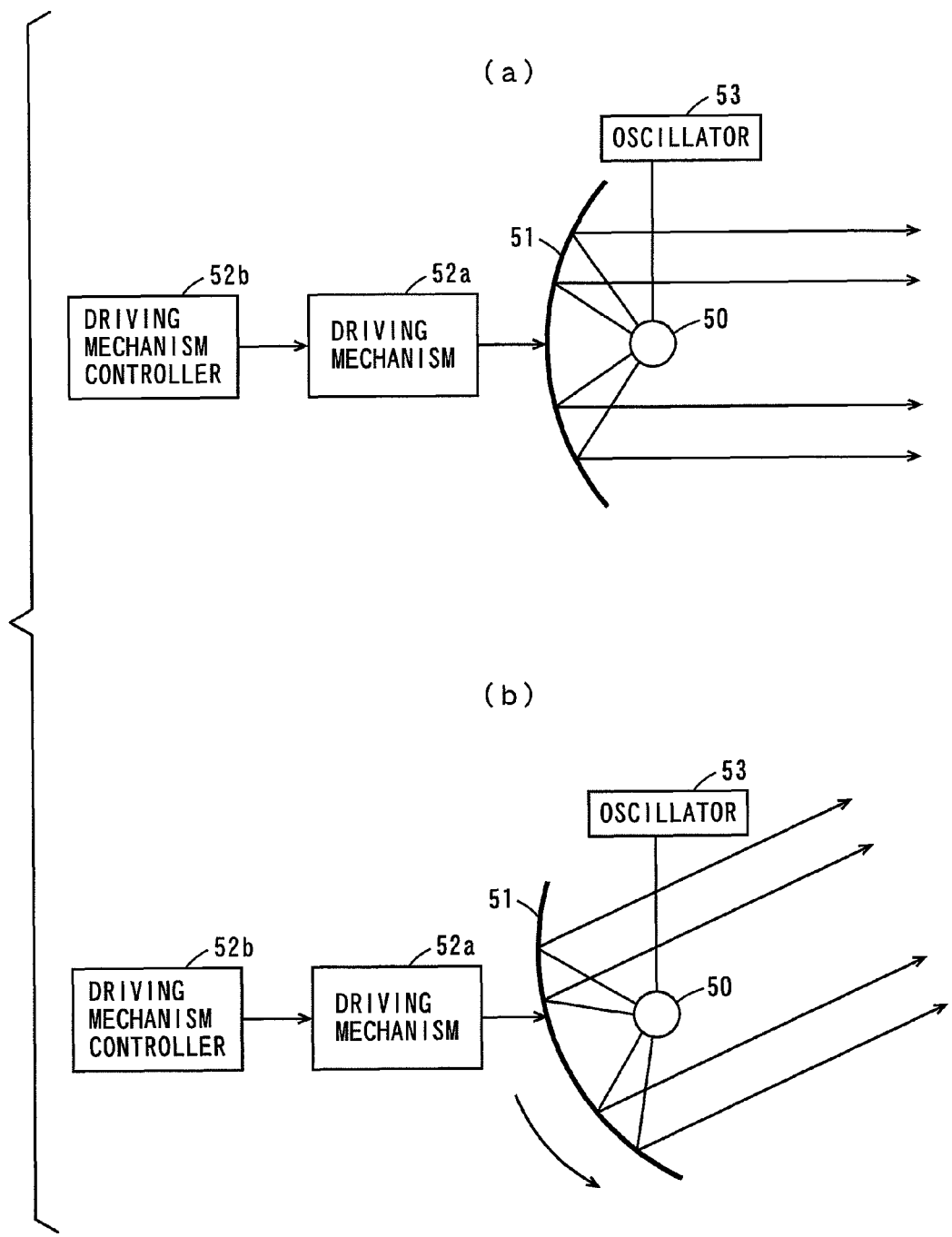
FIG. 2 is a schematic view showing a configuration of a microwave transmitter when scanning of microwaves is mechanically performed.
Figure 3:
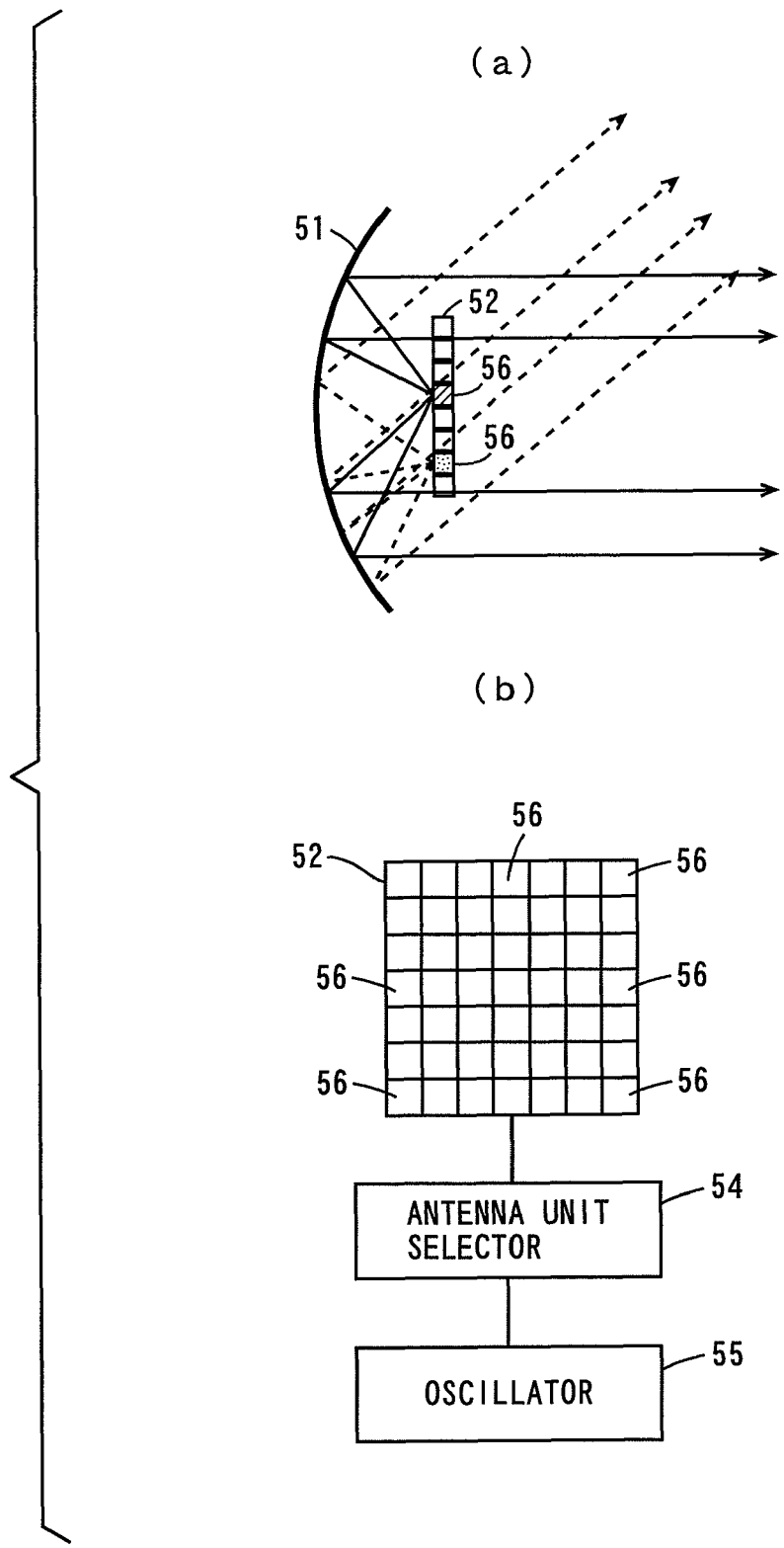
FIG. 3 is a schematic view showing a configuration of the microwave transmitter when scanning of the microwaves is electrically performed.

FIG. 2 is a schematic view showing the configuration of the microwave transmitter 1 when the scanning of the microwaves is mechanically performed. FIG. 3 is a schematic view showing the configuration of the microwave transmitter 1 when the scanning of the microwaves is electrically performed.

As shown in FIG. 2 (a), the microwave transmitter 1 includes an antenna 50, a parabolic reflection plate 51, a driving mechanism 52a composed of a motor and so on, a driving mechanism controller 52b and an oscillator 53.

The driving mechanism 52a that rotates the parabolic reflection plate 51 is attached to the parabolic reflection plate 51, and the driving mechanism controller 52b that controls an operation of the driving mechanism 52a is connected to the driving mechanism 52a.

The oscillator 53 generates the microwaves based on the power applied from the power controller 3. The generated microwaves are radiated from the antenna 50.

The microwaves radiated from the antenna 50 are reflected by the parabolic reflection plate 51, and emitted in one direction.

As shown in FIG. 2 (b), when the parabolic reflection plate 51 is rotated by the driving mechanism 52a, reflection angles of the microwaves radiated from the antenna 50 are changed, so that the microwaves are emitted in a direction different from the foregoing direction.

By such a configuration, the direction of emission of the microwaves can be two-dimensionally scanned in the microwave transmitter 1.

Next, the configuration of the microwave transmitter 1 when the scanning of the microwaves is electrically performed is described.

As shown in FIG. 3 (a), the microwave transmitter 1 includes the parabolic reflection plate 51 and an antenna unit group 52.

As shown in FIG. 3 (b), the antenna unit group 52 includes a plurality of antenna units 56 arranged in the form of a matrix.

An antenna unit selector 54 is connected to the antenna unit group 52. An oscillator (a two-dimensional array type oscillator) 55 is connected to the antenna unit selector 54.

In the above-described configuration, the antenna unit selector 54 selects any of the plurality of antenna units 56 to connect the selected antenna unit 56 to the oscillator 55. The oscillator 55 generates the microwaves based on the power applied from the power controller 3. Accordingly, the generated microwaves are radiated from the selected antenna unit 56. The microwaves radiated from the antenna unit 56 are reflected in one direction by the parabolic reflection plate 51.

Here, the microwaves radiated from the respective antenna units 56 are reflected in different directions.

Thus, the microwaves radiated from one antenna unit 56 selected by the antenna unit selector 54 are reflected in one direction by the parabolic reflection plate 51, and emitted in the direction indicated by the solid line in FIG. 3 (a), for example.

In addition, the microwaves radiated from another antenna unit 56 selected by the antenna unit selector 54 are reflected in another one direction by the parabolic reflection plate 51, and emitted in the direction indicated by the dotted line in FIG. 3 (a), for example.

As described above, any of the plurality of antenna units 56 is selected by the antenna unit selector 54, so that the direction of emission of the microwaves can be two-dimensionally changed (scanned) in the example of the microwave transmitter 1 of FIG. 3.

(1-3) Flow of the Power Transmission

Next, a flow of transmitting the microwaves to the remote controller 100 by the television receiver 200 and charging the remote controller 100 using the received microwaves are described in detail. Note that operations of the direction retrieval unit 2 of the television receiver 200 and operations of the microwave receiver 21 of the remote controller 100 are separately explained while referring to respective flowcharts in the following.

Figure 4:
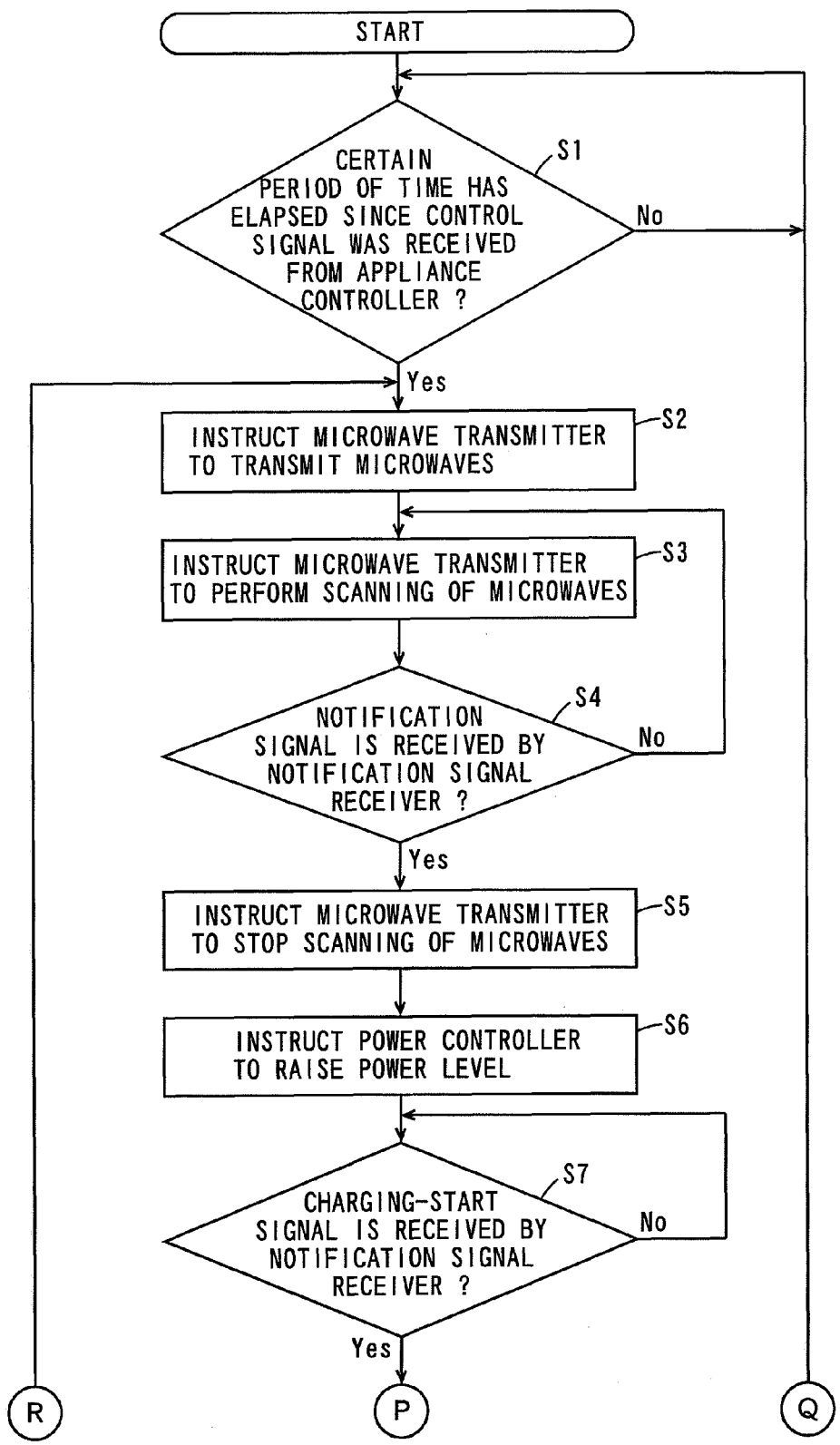
FIG. 4 is a flowchart showing processes by a direction retrieval unit of the television receiver.
Figure 5:
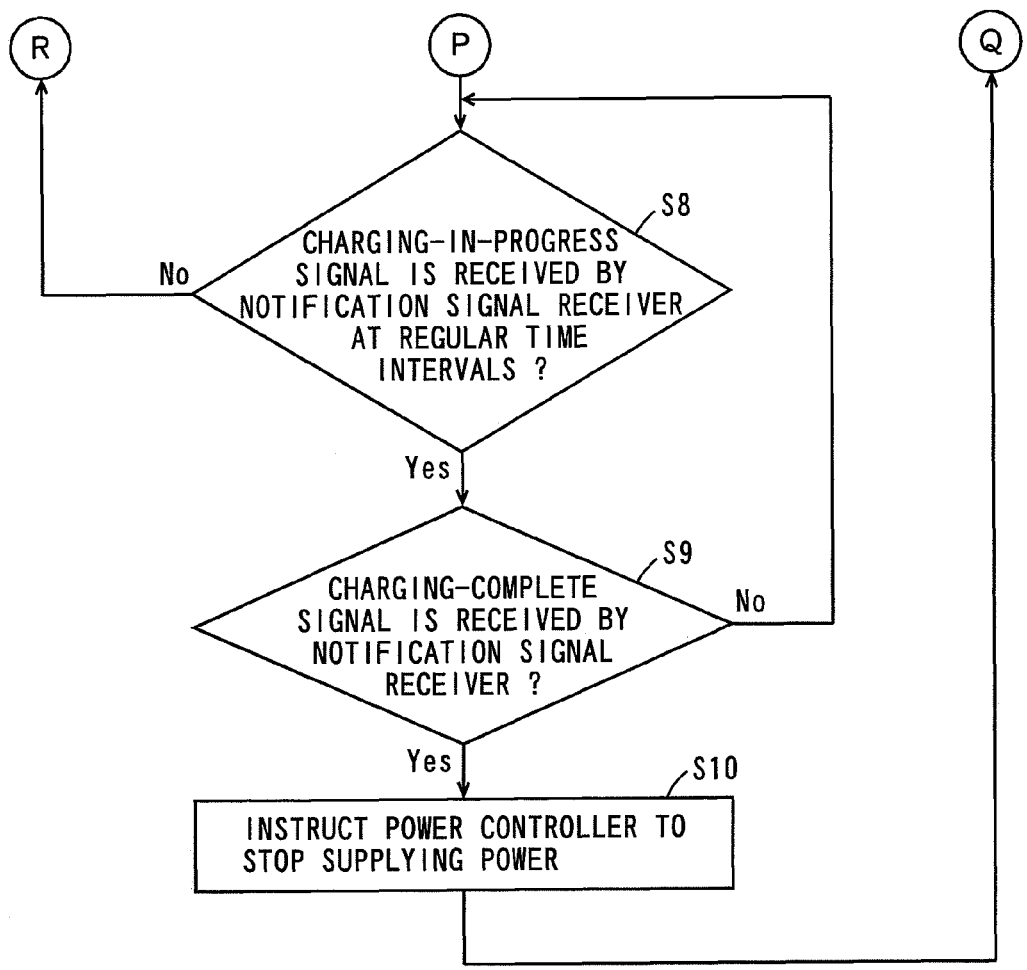
FIG. 5 is a flowchart showing processes by the direction retrieval unit of the television receiver.

FIGS. 4 and 5 are flowcharts showing processes of the direction retrieval unit 2 of the television receiver 200.

When a user operates the appliance control content input unit 26 of the remote controller 100, the control signals are applied from the appliance controller 7 to the direction retrieval unit 2 and the functional unit 8.

As shown in FIG. 4, first, the direction retrieval unit 2 determines whether or not a certain period of time has elapsed since it received the control signal from the appliance controller 7, that is, whether or not a certain period of time has elapsed since the user operated the remote controller 100 (step S1). When a certain period of time has not elapsed since the direction retrieval unit 2 received the above-mentioned control signal from the appliance controller 7, the direction retrieval unit 2 stands by until a certain period of time elapses.

When a certain period of time has elapsed since the user operated the remote controller 100, it can be assumed that the user has finished using the remote controller 100 and placed the remote controller 100 at any position. In this case, the user is quite likely to be away from the remote controller 100.

The foregoing determination as to whether or not a certain period of time has elapsed since the user operated the remote controller 100 is made in order to prevent effects of the microwaves on a human body and a decrease in efficiency of the power transmission.

When a certain period of time has elapsed since the above-mentioned control signal was received from the appliance controller 7 in the process of step S1, the direction retrieval unit 2 instructs the microwave transmitter 1 to transmit the microwaves (step S2), and then instructs the microwave transmitter 1 to perform the scanning of the microwaves (step S3).

The direction retrieval unit 2 subsequently determines whether or not the notification signal receiver 5 receives the notification signal from the notification signal transmitter 27 of the remote controller 100 (step S4). When the notification signal receiver 5 does not receive the notification signal, the direction retrieval unit 2 returns to the process of step S3 to again instruct the microwave transmitter 1 to perform the scanning of the microwaves.

When the notification signal receiver 5 receives the notification signal in the process of step S3, the direction retrieval unit 2 instructs the microwave transmitter 1 to stop the scanning of the microwaves (step S5).

Then, the direction retrieval unit 2 instructs the power controller 3 to raise the power level of the microwaves (step S6).

Next, the direction retrieval unit 2 determines whether or not the notification signal receiver 5 receives from the notification signal transmitter 27 of the remote controller 100 the charging-start signal indicating that the charging is started (step S7). When the notification signal receiver 5 does not receive the charging-start signal, the direction retrieval unit 2 stands by until the notification signal receiver 5 receives the charging-start signal.

When the notification signal receiver 5 receives the charging-start signal in the process of step S7, the direction retrieval unit 2 determines whether or not the notification signal receiver 5 receives from the notification signal transmitter 27 of the remote controller 100 at regular time intervals the charging-in-progress signals indicating that the charging is in progress (step S8 of FIG. 5). When the notification signal receiver 5 does not receive the charging-in-progress signals at regular time intervals, the direction retrieval unit 2 returns to the process of step S2 to repeat the processes of steps S2 to S8.

When the notification signal receiver 5 receives the charging-in-progress signals at regular time intervals in the process of step S8, the direction retrieval unit 2 determines whether or not the notification signal receiver 5 receives from the notification signal transmitter 27 of the remote controller 100 the charging-complete signal indicating that the charging is completed (step S9). When the notification signal receiver 5 does not receive the charging-complete signal, the direction retrieval unit 2 returns to the process of step S8 to repeat the processes of steps S8, S9.

When the notification signal receiver 5 receives the charging-complete signal in the process of step S9, the direction retrieval unit 2 instructs the power controller 3 to stop supplying the power (step S10).

Then, the direction retrieval unit 2 returns to the process of step S1 to repeat the processes of steps S1 to S10.

Figure 6:
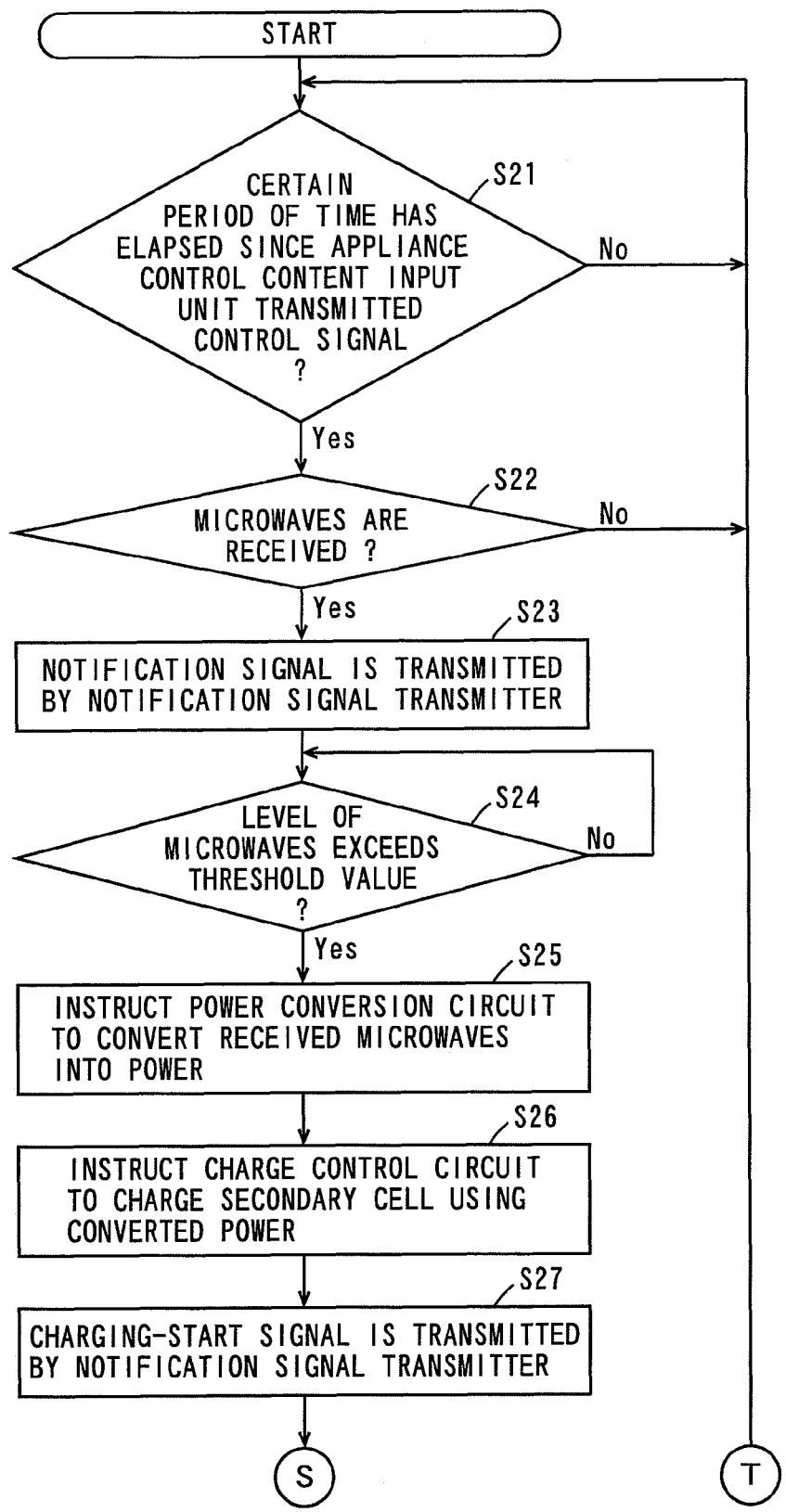
FIG. 6 is a flowchart showing processes by a microwave receiver of a remote controller.
Figure 7:
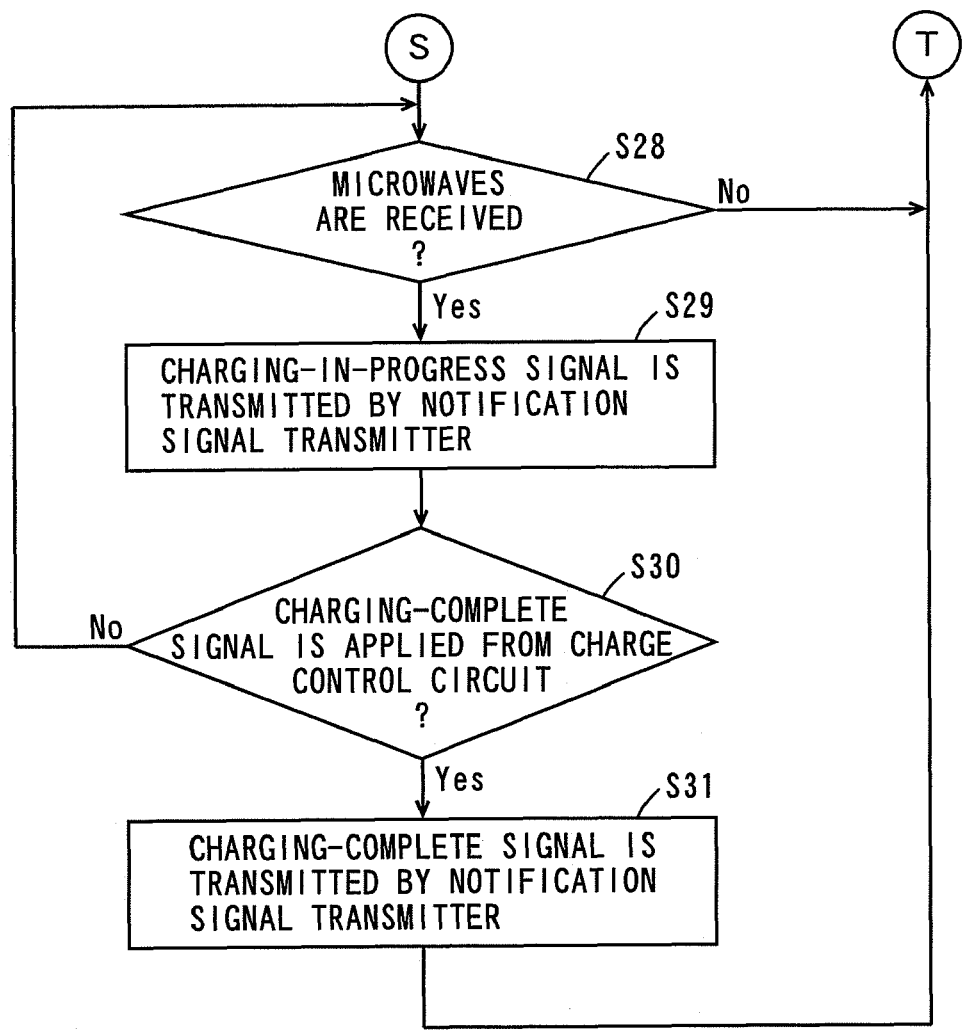
FIG. 7 is a flowchart showing processes by the microwave receiver of the remote controller.

FIGS. 6 and 7 are flowcharts showing processes of the microwave receiver 21 of the remote controller 100.

As shown in FIG. 6, first, the microwave receiver 21 determines whether or not a certain period of time has elapsed since the appliance control content input unit 26 transmitted the control signal, that is, whether or not a certain period of time has elapsed since the user operated the remote controller 100 (step S21). When a certain period of time has not elapsed since the appliance control content input unit 26 transmitted the above-mentioned control signal, the microwave receiver 21 stands by until a certain period of time elapses.

When a certain period of time has elapsed since the appliance control content input unit 26 transmitted the above-mentioned control signal in the process of step S21, the microwave receiver 21 determines whether or not it receives the microwaves from the microwave transmitter 1 of the television receiver 200 (step S22). When the microwave receiver 21 does not receive the microwaves from the microwave transmitter 1, it returns to the process of step S21 to repeat the processes of steps S21, S22.

When the microwave receiver 21 receives the microwaves from the microwave transmitter 1 in the process of step S22, it causes the notification signal transmitter 27 to transmit to the television receiver 200 the notification signal indicating that the microwaves were received (step S23).

The microwave receiver 21 subsequently determines whether or not the power level of the received microwaves exceeds a predetermined threshold value (step S24). When the power level of the microwaves does not exceed the predetermined threshold value, the microwave receiver 21 stands by until the power level of the microwaves exceeds the predetermined threshold value.

When the power level of the microwaves exceeds the predetermined threshold value in the process of step S24, the microwave receiver 21 instructs the power conversion circuit 22 to convert the received microwaves into power (step S25).

The microwave receiver 21 subsequently instructs the charge control circuit 23 to charge the secondary cell 24 using the converted power (step S26).

Next, the microwave receiver 21 causes the notification signal transmitter 27 to transmit the charging-start signal to the television receiver 200 (step S27).

The microwave receiver 21 then determines whether or not it continuously receives the microwaves from the microwave transmitter 1 of the television receiver 200 (step S28). When the microwave receiver 21 does not continuously receive the microwaves, it returns to the process of step S21 to repeat the processes of steps S21 to S28.

When the microwave receiver 21 continuously receives the microwaves in the process of step S28, it causes the notification signal transmitter 27 to transmit the charging-in-progress signals to the television receiver 200 (step S29). Note that the determination as to whether or not the microwaves are received in the process of step S28 after the process of step S22 is again made in order to determine whether or not the microwave receiver 21 can receive the microwaves when the remote controller 100 is moved by the user.

Next, the microwave receiver 21 determines whether or not the charging-complete signal is applied from the charge control circuit 23 (step S30 of FIG. 7). When the charging-complete signal is not applied from the charge control circuit 23, the microwave receiver 21 returns to the process of step S28 to repeat the processes of steps S28 to S30.

When the charging-complete signal is applied from the charge control circuit 23 in the process of step S30, the microwave receiver 21 causes the notification signal transmitter 27 to transmit the charging-complete signal to the television receiver 200 (step S31).

Then, the microwave receiver 21 returns to the process of step S21 to repeat the processes of steps S21 to S31.

(1-4) Effects of the First Embodiment

As described above, the direction in which the remote controller 100 exists is detected and the microwave transmitter 1 of the television receiver 200 transmits the power through the microwaves toward the detected direction while the secondary cell 24 of the remote controller 100 is charged in the first embodiment. This eliminates necessity for users to place the remote controller 100 in a fixed position such as a holder (charging device). Accordingly, it does not take time and labor for users to charge the secondary cell 24 of the remote controller 100. This causes the remote controller 100 to be easily used by users.

(2) Second Embodiment

(2-1) Configurations of Remote Controller and Television Receiver

Figure 8:
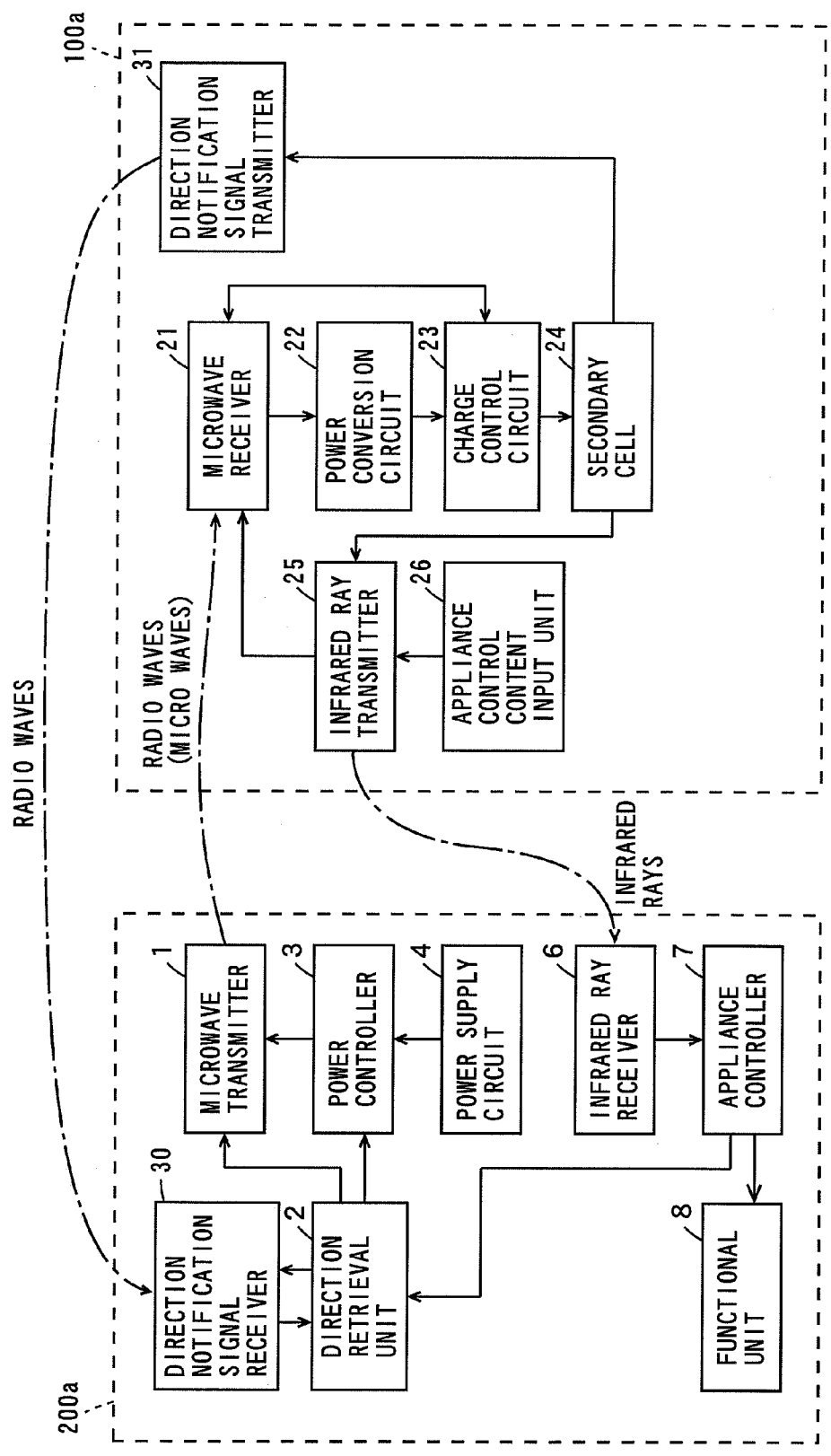
FIG. 8 is a block diagram showing configurations of a remote controller and a television receiver according to a second embodiment.

FIG. 8 is a block diagram showing configurations of a remote controller and a television receiver according to a second embodiment.

As shown in FIG. 8, the configurations of the remote controller 100a and the television receiver 200a according to the second embodiment are different from the configurations of the remote controller 100 and the television receiver 200 according to the first embodiment in that a direction notification signal transmitter 31 instead of the notification signal transmitter 27 is provided in the remote controller 100a, and a direction notification signal receiver 30 instead of the notification signal receiver 5 is provided in the television receiver 200a.

While the direction of the remote controller 100 is retrieved from the side of the television receiver 200 in the first embodiment as described above, the present embodiment employs a configuration in which a direction notification signal for detecting the direction in which the remote controller 100a exists from the side of the remote controller 100a is applied to the television receiver 200a.

In the present embodiment, the direction notification signal transmitter 31 includes a non-directional antenna and a modulator, and the direction notification signal receiver 30 includes a first antenna and a second antenna A (FIG. 9), which will be described later. The first antenna of the direction notification signal receiver 30 is constituted by a non-directional antenna, and the second antenna A is constituted by a directional (super-narrow directional) antenna.

The direction notification signal is transmitted by the non-directional antenna of the direction notification signal transmitter 31 of the remote controller 100a. Then, the direction notification signal is received by the first antenna of the direction notification signal receiver 30 of the television receiver 200a. Thus, first, the presence or absence of the direction notification signal from the direction notification signal transmitter 31 is detected.

Thereafter, the direction in which receiving intensity of the direction notification signal is maximized is detected by the second antenna A of the direction notification signal receiver 30. Then, the directional antenna of the microwave transmitter 1 is directed to the detected direction, that is, the direction in which the remote controller 100a exists, and the power is transmitted through the microwaves.

Now, description is made of a configuration of the second antenna A of the direction notification signal receiver 30.

Figure 9:
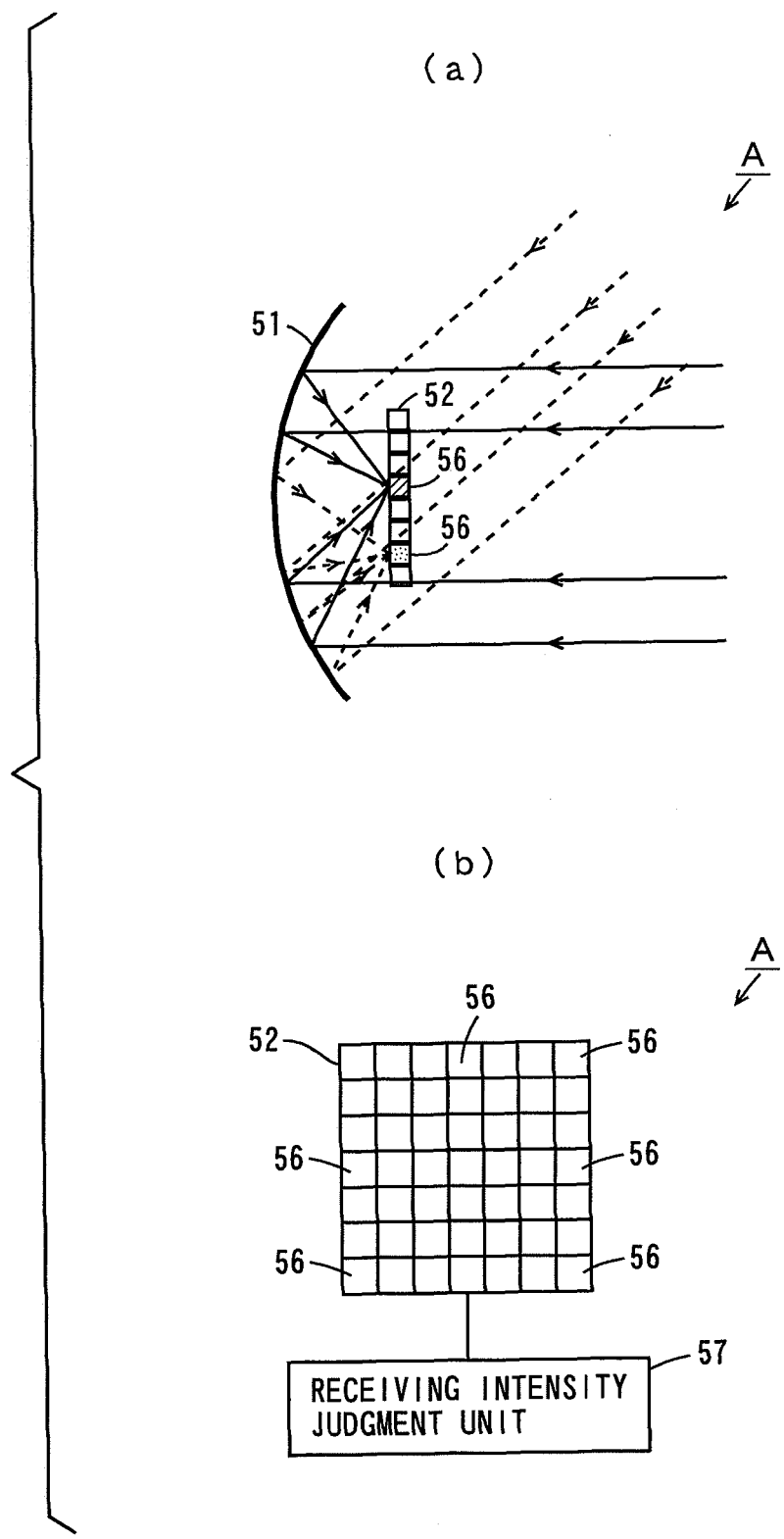
FIG. 9 is a schematic view showing a configuration of a second antenna of a direction notification signal receiver.

FIG. 9 is a schematic view showing the configuration of the second antenna A of the direction notification signal receiver 30.

As shown in FIG. 9 (a), the second antenna A includes the parabolic reflection plate 51 and the antenna unit group 52. In addition, the second antenna A includes the antenna unit group 52 including the plurality of antenna units 56 that are the same as the above-described antenna units 56 (FIG. 3 (b)) and a receiving intensity judgment unit 57.

The direction notification signals incident from different directions on the parabolic reflection plate 51 are reflected in different directions, respectively, to be incident on respective different antenna units 56 of the antenna unit group 52. This causes the plurality of antenna units 56 to receive the respective direction notification signals transmitted from the different directions. For example, the direction notification signals transmitted from one direction indicated by the solid line in FIG. 9 (a) are received in one antenna unit 56 of the antenna unit group 52, and the direction notification signals transmitted from another one direction indicated by the dotted line in FIG. 9 (a) are received in another one antenna unit 56 of the antenna unit group 52.

The receiving intensity judgment unit 57 judges the antenna unit 56 with the strongest receiving intensity of the plurality of antenna units 56. Accordingly, the direction of a source transmitting the direction notification signal, that is, the direction in which the remote controller 100a exists can be detected.

Note that an antenna capable of mechanically detecting the receiving direction may be used as the second antenna A. Specifically, the receiving intensity judgment unit 57 that judges the level of the receiving intensity of the antenna 50 is provided instead of the oscillator 53 of FIG. 2 to detect the receiving direction based on the orientation of the parabolic reflection plate 51 when the receiving intensity is maximized.

(2-2) Flow of the Power Transmission

Next, a flow of transmitting the microwaves to the remote controller 100a by the television receiver 200a and charging the remote controller 100a using the received microwaves are described in detail. Note that operations of the direction retrieval unit 2 of the television receiver 200a and operations of the microwave receiver 21 of the remote controller 100a are separately explained while referring to respective flow-charts in the following.

Figure 10:
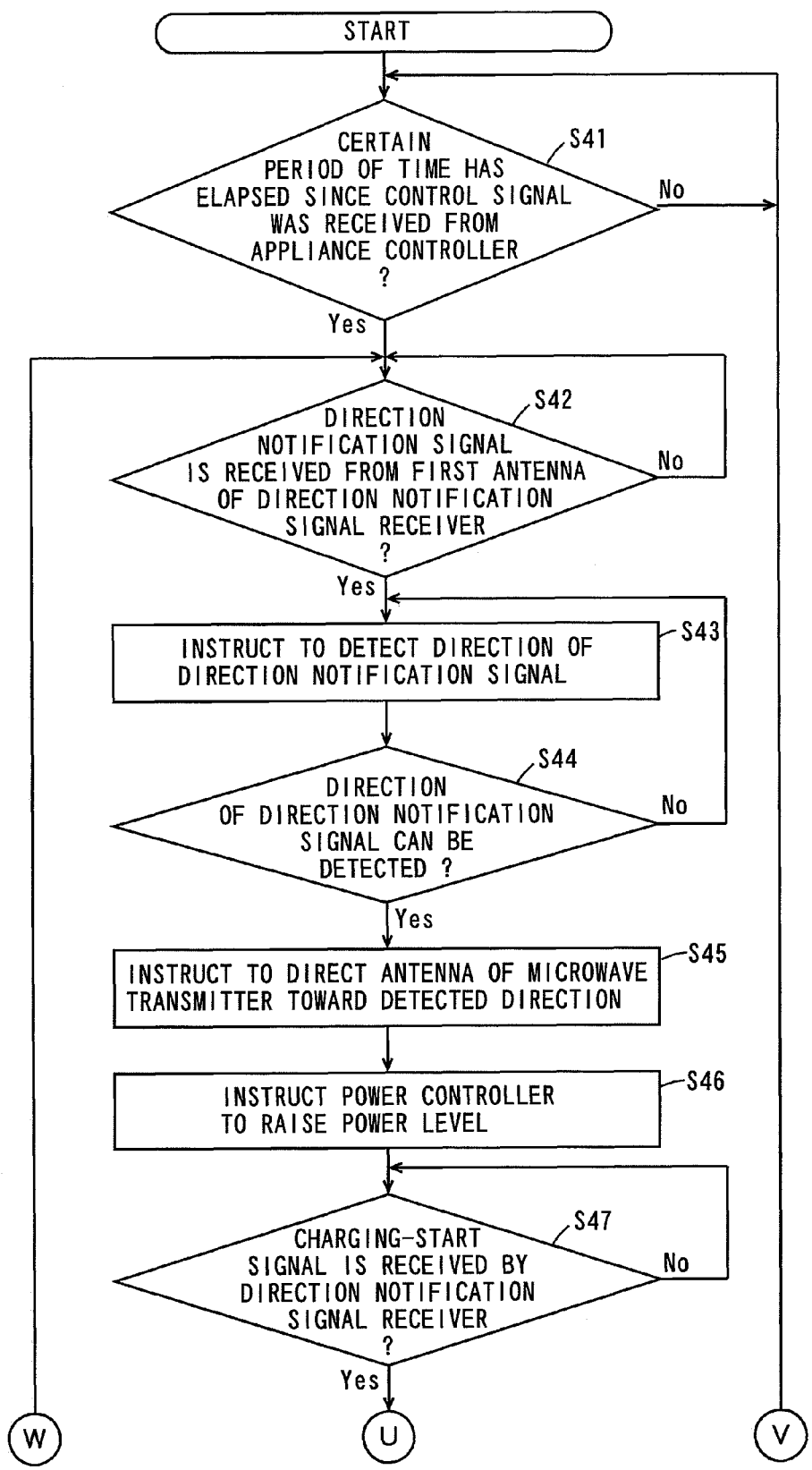
FIG. 10 is a flowchart showing processes by the direction retrieval unit of the television receiver.
Figure 11:
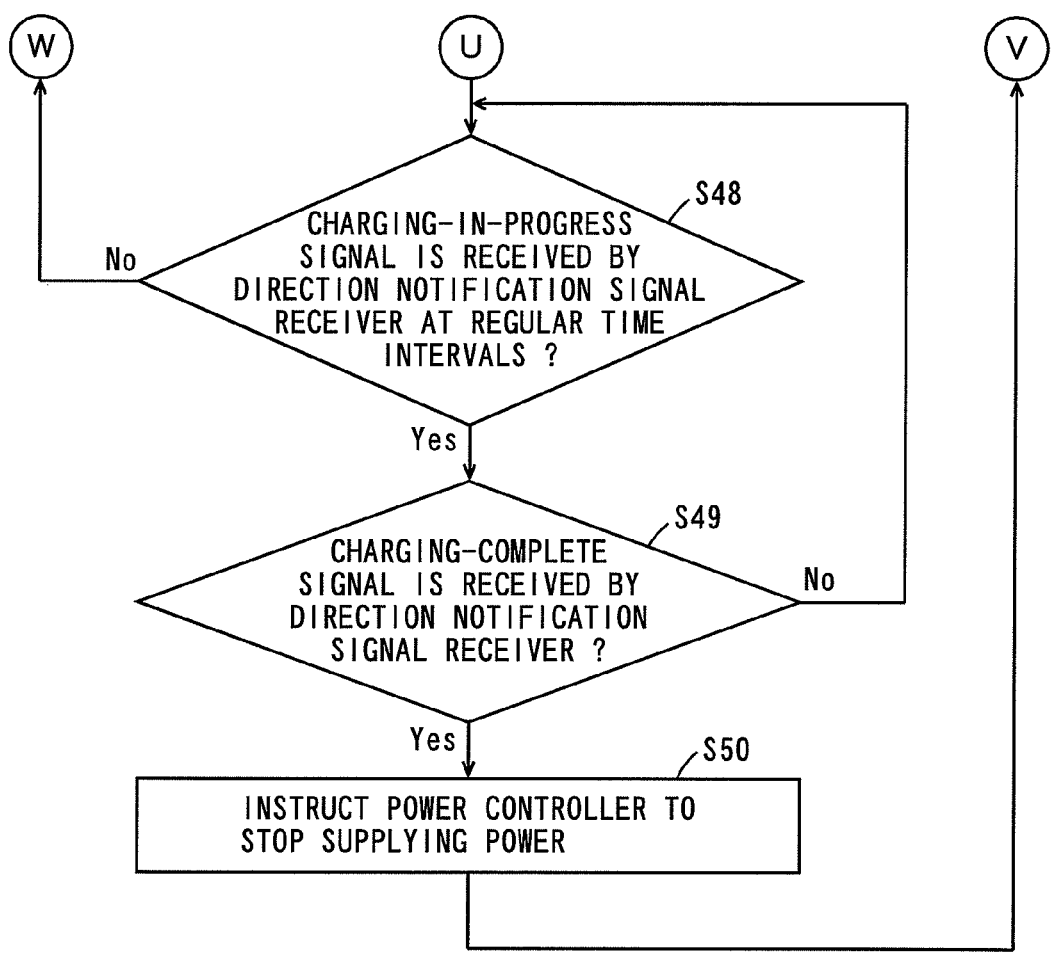
FIG. 11 is a flowchart showing processes by the direction retrieval unit of the television receiver.

FIGS. 10 and 11 are flowcharts showing processes of the direction retrieval unit 2 of the television receiver 200a.

As shown in FIG. 10, first, the direction retrieval unit 2 determines whether or not a certain period of time has elapsed since it received from the appliance controller 7 a control signal indicating that the user operated the appliance control content input unit 26 of the remote controller 100a, that is, whether or not a certain period of time has elapsed since the user operated the remote controller 100a (step S41). When a certain period of time has not elapsed since the direction retrieval unit 2 received the above-mentioned control signal from the appliance controller 7, the direction retrieval unit 2 stands by until a certain period of time elapses.

When a certain period of time has elapsed since the direction retrieval unit 2 received the above-mentioned control signal from the appliance controller 7 in the process of step S41, the direction retrieval unit 2 determines whether or not it receives from the first antenna of the direction notification signal receiver 30 the direction notification signal for detecting the direction in which the remote controller 10a exists (step S42). When the direction retrieval unit 2 does not receive the direction notification signal, it stands by until the direction notification signal is received. In this manner, the presence or absence of the direction notification signal from the direction notification signal transmitter 31 of the remote controller 100a is detected using the first antenna of the direction notification signal receiver 30.

When the direction notification signal is received in the process of step S42, the direction retrieval unit 2 instructs the receiving intensity judgment unit 57 of the second antenna A to detect the direction of the direction notification signal (step S43).

Then, the direction retrieval unit 2 judges the antenna unit 56 at which the receiving intensity of the direction notification signal transmitted from the direction notification signal transmitter 31 of the remote controller 100a is maximized, thereby determining whether or not the direction of the direction notification signal can be detected (step S44).

When the direction of the direction notification signal cannot be detected, the direction retrieval unit 2 returns to the process of step S43 to repeat the processes of steps S43, S44. The antenna unit 56 at which the receiving intensity of the direction notification signal is maximized is judged as described above, so that the direction of the source transmitting the direction notification signal, that is, the direction in which the remote controller 100*a* exists is detected.

When the direction of the direction notification signal can be detected in the process of step S44, the direction retrieval unit 2 instructs the microwave transmitter 1 to direct the directional antenna toward the detected direction (step S45).

Next, the direction retrieval unit 2 instructs the power controller 3 to raise the power level of the microwaves (step S46).

The direction retrieval unit 2 subsequently determines whether or not the direction notification signal receiver 30 receives from the direction notification signal transmitter 31 of the remote controller 100*a* the charging-start signal indicating that the charging is started (step S47). When the direction notification signal receiver 30 does not receive the charging-start signal, the direction retrieval unit 2 stands by until the direction notification signal receiver 30 receives the charging-start signal.

When the direction notification signal receiver 30 receives the charging-start signal in the process of step S47, the direction retrieval unit 2 determines whether or not the direction notification signal receiver 30 receives from the direction notification signal transmitter 31 of the remote controller 100*a* at regular time intervals the charging-in-progress signals indicating that the charging is in progress (step S48 of FIG. 11). When the direction notification signal receiver 30 does not receive the charging-in-progress signals at regular time intervals, the direction retrieval unit 2 returns to the process of step S42 to repeat the processes of steps S42 to S48.

When the direction notification signal receiver 30 receives the charging-in-progress signals at regular time intervals in the process of step S48, the direction retrieval unit 2 determines whether or not the direction notification signal receiver 30 receives from the direction notification signal transmitter 31 of the remote controller 100*a* the charging-complete signal indicating that the charging is completed (step S49). When the direction notification signal receiver 30 does not receive the charging-complete signal, the direction retrieval unit 2 returns to the process of step S48 to repeat the processes of steps S48, S49.

When the direction notification signal receiver 30 receives the charging-complete signal in the process of step S49, the direction retrieval unit 2 instructs the power controller 3 to stop supplying the power (step S50).

The direction retrieval unit 2 then returns to the process of step S41 to repeat the processes of steps S41 to S50.

Figure 12:
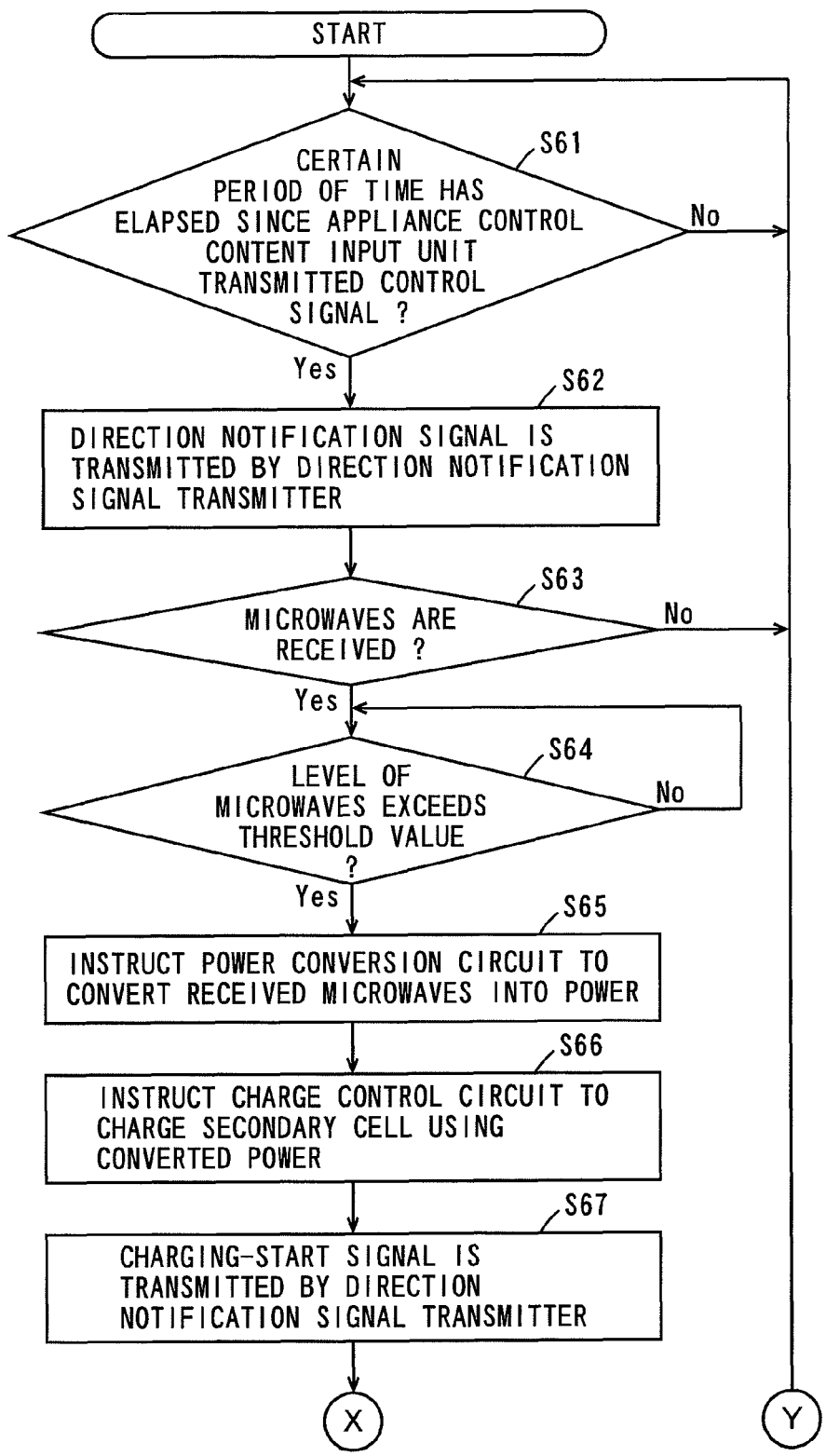
FIG. 12 is a flowchart showing processes of the microwave receiver of the remote controller.
Figure 13:
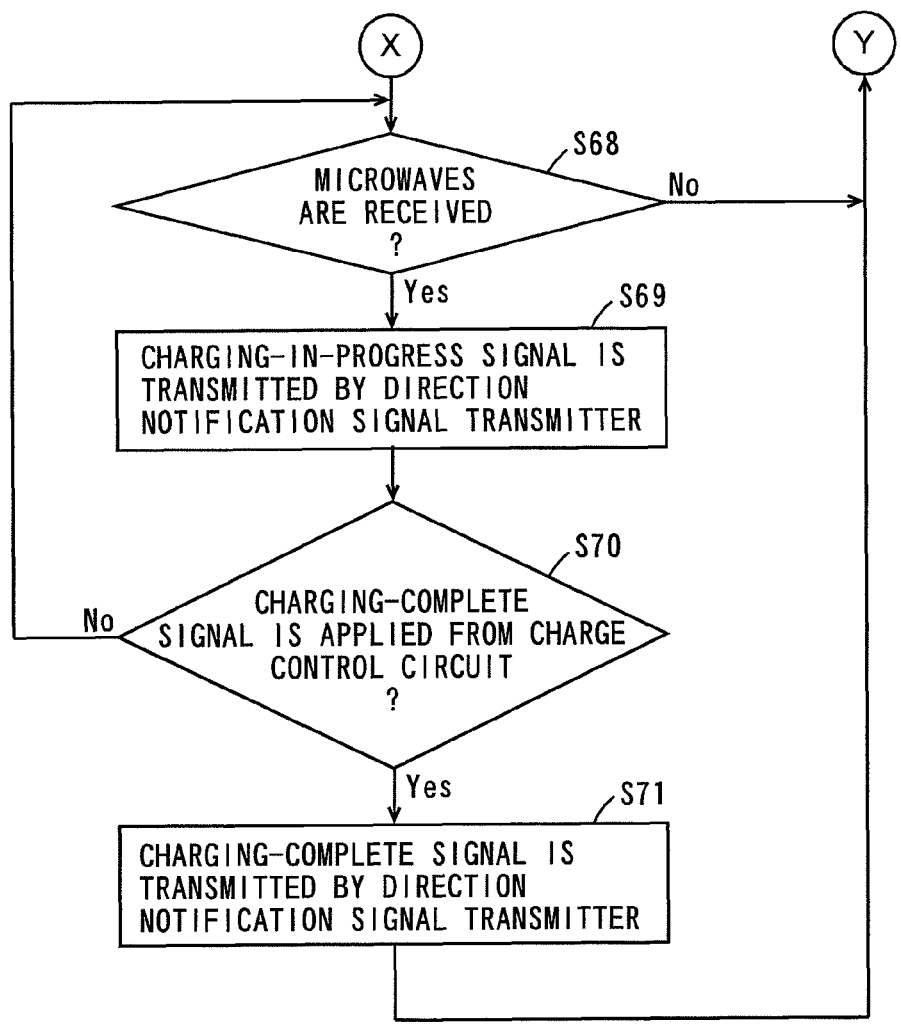
FIG. 13 is a flowchart showing processes of the microwave receiver of the remote controller.

FIGS. 12 and 13 are flowcharts showing processes of the microwave receiver 21 of the remote controller 100*a*.

As shown in FIG. 12, first, the microwave receiver 21 determines whether or not a certain period of time has elapsed since the appliance control content input unit 26 transmitted the control signal, that is, whether or not a certain period of time has elapsed since the user operated the remote controller 100*a* (step S61). When a certain period of time has not elapsed since the above-mentioned control signal was transmitted by the appliance control content input unit 26, the microwave receiver 21 stands by until a certain period of time elapses.

When a certain period of time has elapsed since the appliance control content input unit 26 transmitted the above-mentioned control signal in the process of step S61, the microwave receiver 21 causes the direction notification signal transmitter 31 to apply the direction notification signal to the television receiver 200*a* (step S62).

Next, the microwave receiver 21 determines whether or not the microwaves are received from the microwave transmitter 1 of the television receiver 200*a* (step S63). When the microwave receiver 21 does not receive the microwaves from the microwave transmitter 1, it returns to the process of step S61 to repeat the processes of steps S61 to S63.

When the microwave receiver 21 receives the microwaves from the microwave transmitter 1 in the process of step S63, it determines whether or not the power level of the received microwaves exceeds the predetermined threshold value (step S64). When the power level of the microwaves does not exceed the predetermined threshold value, the microwave receiver 21 stands by until the power level of the microwaves exceeds the predetermined threshold value.

When the power level of the microwaves exceeds the predetermined threshold value in the process of step S64, the microwave receiver 21 instructs the power conversion circuit 22 to convert the received microwaves into power (step S65).

Then, the microwave receiver 21 instructs the charge control circuit 23 to charge the secondary cell 24 using the converted power (step S66).

Next, the microwave receiver 21 causes the direction notification signal transmitter 31 to transmit the charging-start signal to the television receiver 200*a* (step S67).

The microwave receiver 21 subsequently determines whether or not it continuously receives the microwaves from the microwave transmitter 1 of the television receiver 200*a* (step S68 of FIG. 13). When the microwave receiver 21 does not continuously receive the microwaves, it returns to the process of step S61 to repeat the processes of steps S61 to S68.

When the microwave receiver 21 continuously receives the microwaves in the process of step S68, it causes the direction notification signal transmitter 31 to transmit the charging-in-progress signals to the television receiver 200*a* (step S69).

The microwave receiver 21 then determines whether or not the charging-complete signal is applied from the charge control circuit 23 (step S70). When the charging-complete signal is not applied from the charge control circuit 23, the microwave receiver 21 returns to the process of step S68 to repeat the processes of steps S68 to S70.

When the charging-complete signal is applied from the charge control circuit 23 in the process of step S70, the microwave receiver 21 causes the direction notification signal transmitter 31 to transmit the charging-complete signal to the television receiver 200*a* (step S71).

Then, the microwave receiver 21 returns to the process of step S61 to repeat the processes of steps S61 to S71.

(2-3) Effects of the Second Embodiment

As described above, the direction in which the remote controller 100*a* exists is detected and the microwave transmitter 1 of the television receiver 200*a* transmits the power through the microwaves toward the detected direction while the secondary cell 24 of the remote controller 100*a* is charged in the second embodiment. This eliminates necessity for users to place the remote controller 100*a* in the fixed position such as the holder (charging device). Accordingly, it does not take time and labor for users to charge the remote controller 100*a*. This causes the remote controller 100*a* to be easily used by users.

In addition, in the second embodiment, the direction notification signal for detecting the direction in which the remote controller 100a exists is applied from the direction notification signal transmitter 31 of the remote controller 100a to the television receiver 200a, thereby eliminating the need for the above-described processes such as transmitting the microwaves from the television receiver 200 and waiting for a response from the remote controller 100a. This enables the process of each component to be simplified.

(3) Third Embodiment

(3-1) Configurations of Remote Controller and Television Receiver

Figure 14:
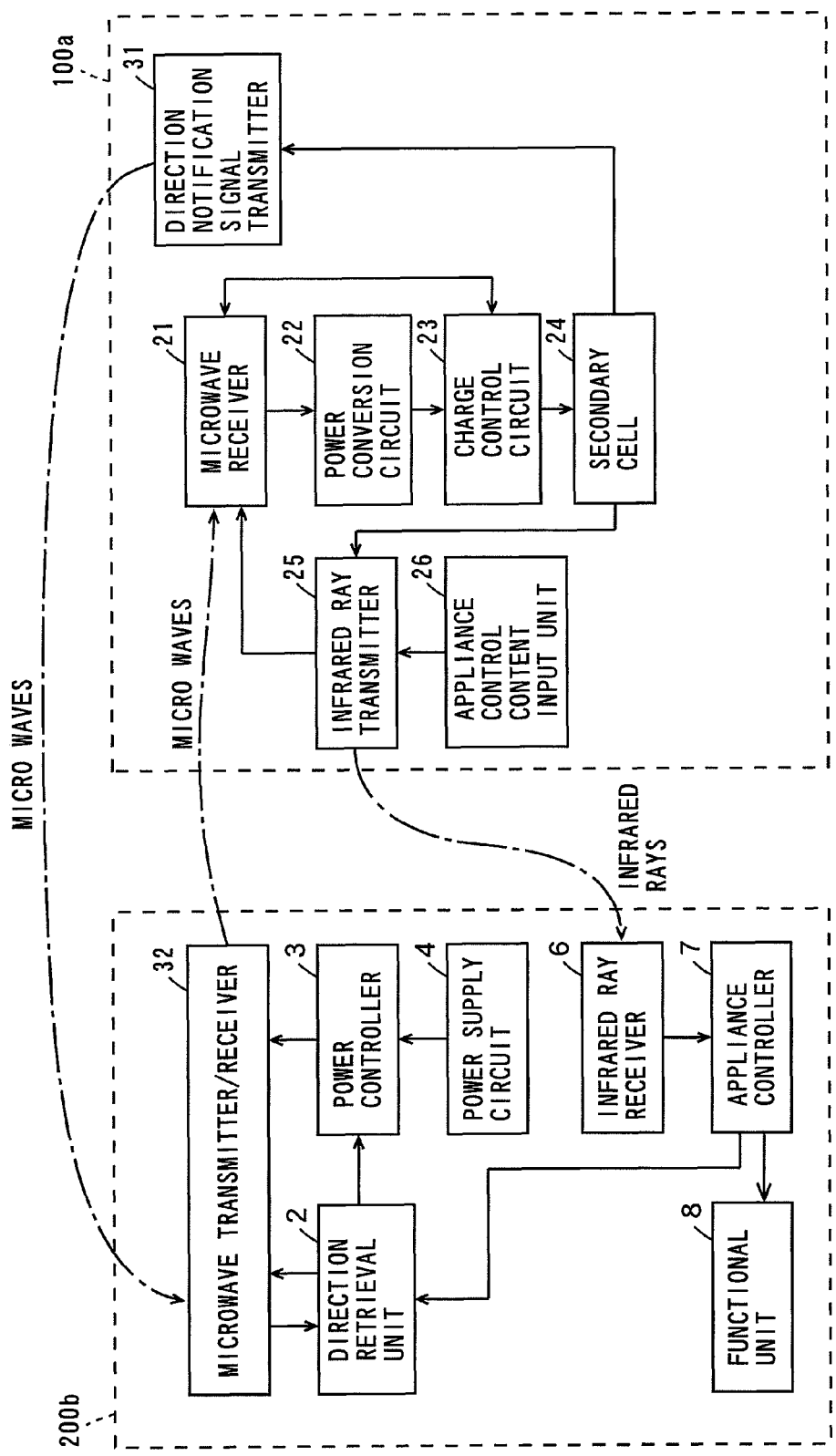
FIG. 14 is a block diagram showing configurations of a remote controller and a television receiver according to a third embodiment.

FIG. 14 is a block diagram showing configurations of a remote controller and a television receiver according to a third embodiment.

As shown in FIG. 14, the configuration of the television receiver 200b according to the third embodiment is different from the configuration of the television receiver 200a according to the second embodiment in that a microwave transmitter/receiver 32 is provided instead of the microwave transmitter 1 and the direction notification signal receiver 30. Note that the configuration of the remote controller according to the third embodiment is the same as the configuration of the remote controller 100a according to the second embodiment.

In the present embodiment, the directional antenna of the microwave transmitter 1 and the second antenna A of the direction notification signal receiver 30 in the television receiver 200a according to the second embodiment are provided in common, resulting in providing the microwave transmitter/receiver 32. In this case, a configuration of the microwave transmitter/receiver 32 is described as follows.

(3-2) The Configuration of the Microwave Transmitter/Receiver

Figure 15:
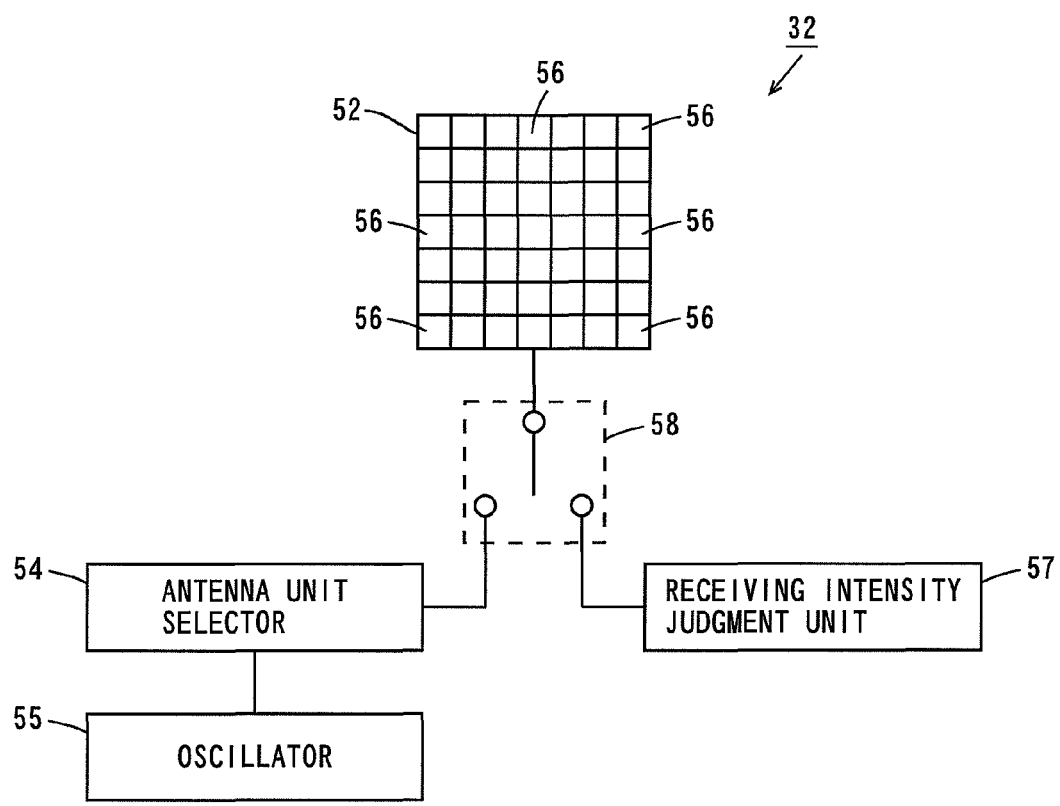
FIG. 15 is a schematic view showing a configuration of a microwave transmitter/receiver.

FIG. 15 is a schematic view showing the configuration of the microwave transmitter/receiver 32.

As shown in FIG. 15, the microwave transmitter/receiver 32 includes the antenna unit group 52 including the plurality of antenna units 56, the antenna unit selector 54, the oscillator 55, the receiving intensity judgment unit 57 and a switch 58. Note that the microwave transmitter/receiver 32 includes the parabolic reflection plate 51 of FIG. 3 (a) although it is not shown in FIG. 15. The directional antenna of the microwave transmitter 1 and the second antenna A of the direction notification signal receiver 30 in the television receiver 200a of FIG. 8 are provided in common, resulting in providing the antenna unit group 52.

When the direction notification signal is received from the direction notification signal transmitter 31 of the remote controller 100a, the switch 58 is connected to the side of the receiving intensity judgment unit 57 in the microwave transmitter/receiver 32.

On the other hand, when the power is transmitted to the remote controller 100a through the microwaves, the switch 58 is connected to the side of the antenna unit selector 54 in the microwave transmitter/receiver 32. Note that the operations of the antenna unit selector 54, the oscillator 55 and the receiving intensity judgment unit 57 have been described above (in FIGS. 3 and 9).

(3-3) Effects of the Third Embodiment

As described above, the direction in which the remote controller 100a exists is detected and the microwave transmitter/receiver 32 of the television receiver 200b transmits the power through the microwaves toward the detected direction while the secondary cell 24 of the remote controller 100a is charged in the third embodiment. This eliminates the necessity for users to place the remote controller 100a in the fixed position such as the holder (charging device). Accordingly, it does not take time and labor for users to charge the secondary cell 24 of the remote controller 100a. This causes the remote controller 100a to be easily used by users.

In addition, the directional antenna of the microwave transmitter 1 and the second antenna A of the direction notification signal receiver 30 of FIG. 8 (the second embodiment) are provided in common, achieving cost reduction and space saving in the third embodiment.

(4) Fourth Embodiment

(4-1) Configurations of Remote Controller and Television Receiver

Figure 16:
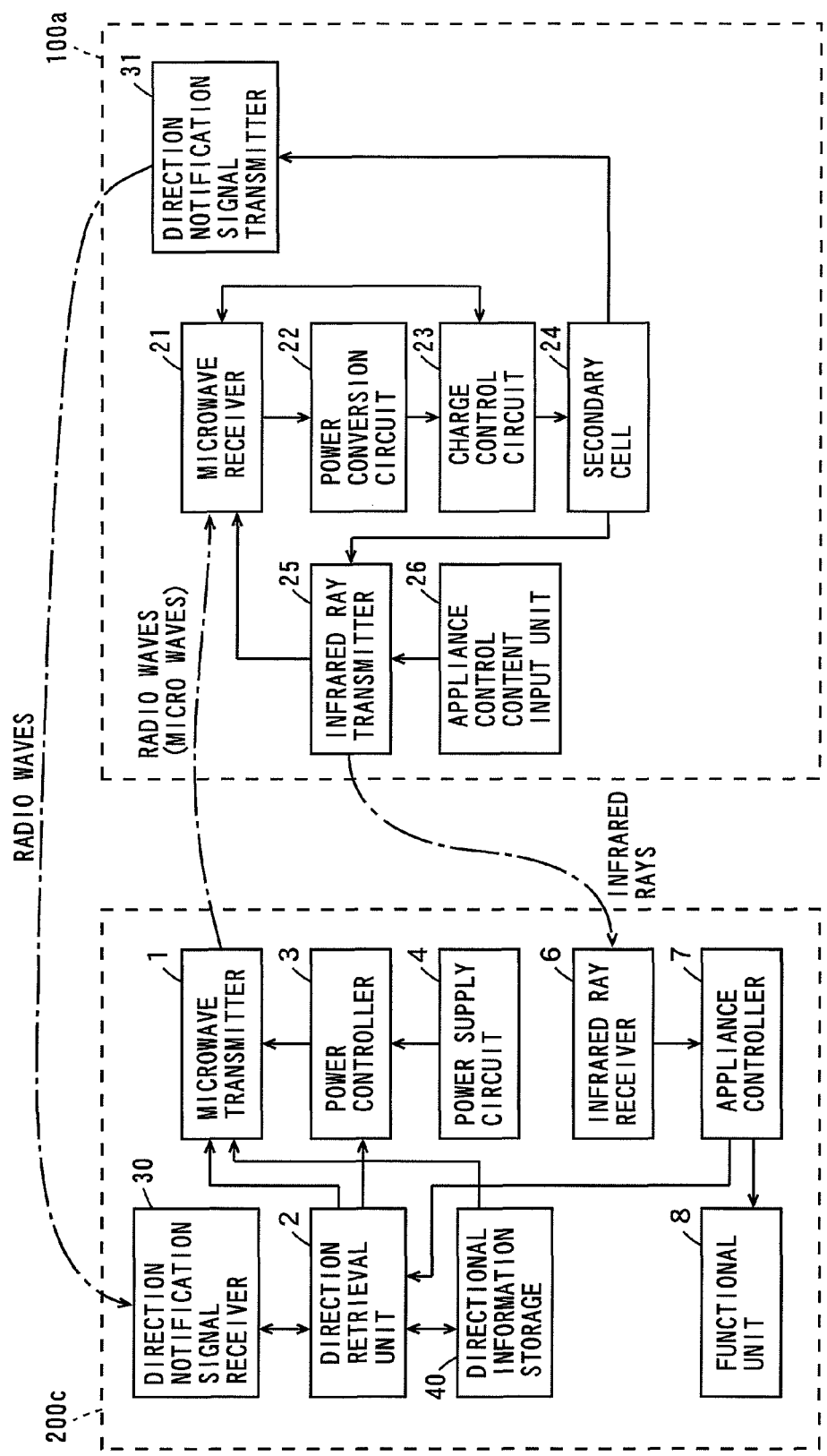
FIG. 16 is a block diagram showing configurations of a remote controller and a television receiver according to a fourth embodiment.

FIG. 16 is a block diagram showing configurations of a remote controller and a television receiver according to a fourth embodiment.

As shown in FIG. 16, the configuration of the television receiver 200c according to the fourth embodiment is different from the configuration of the television receiver 200a according to the second embodiment in that a directional information storage 40 is provided. Note that the configuration of the remote controller according to the fourth embodiment is the same as the configuration of the remote controller 100a according to the second embodiment.

In the present embodiment, a user presses the storage key of the appliance control content input unit 26, so that the direction notification signal for detecting the direction in which the remote controller 10a exists is transmitted to the television receiver 200c by the direction notification signal transmitter 31.

The foregoing direction notification signal is received, and then stored in the directional information storage 40 of the television receiver 200c as directional information.

In many cases, a remote controller that remotely operates an air conditioner, a control appliance in a factory or the like, for example, is set in a fixed position. Therefore, the directional information of the remote controller 100a is stored in the directional information storage 40, thereby eliminating a process of again detecting the direction in which the remote controller 100a exists in the next power transmission.

(4-2) Flow of the Power Transmission

Next, a flow of transmitting the microwaves to the remote controller 10a by the television receiver 200c and charging the remote controller 10a using the received microwaves is described in detail. Note that an operation of the direction retrieval unit 2 of the television receiver 200c and the operation of the microwave receiver 21 of the remote controller 100a are separately explained while referring to respective flowcharts in the following.

Figure 17:
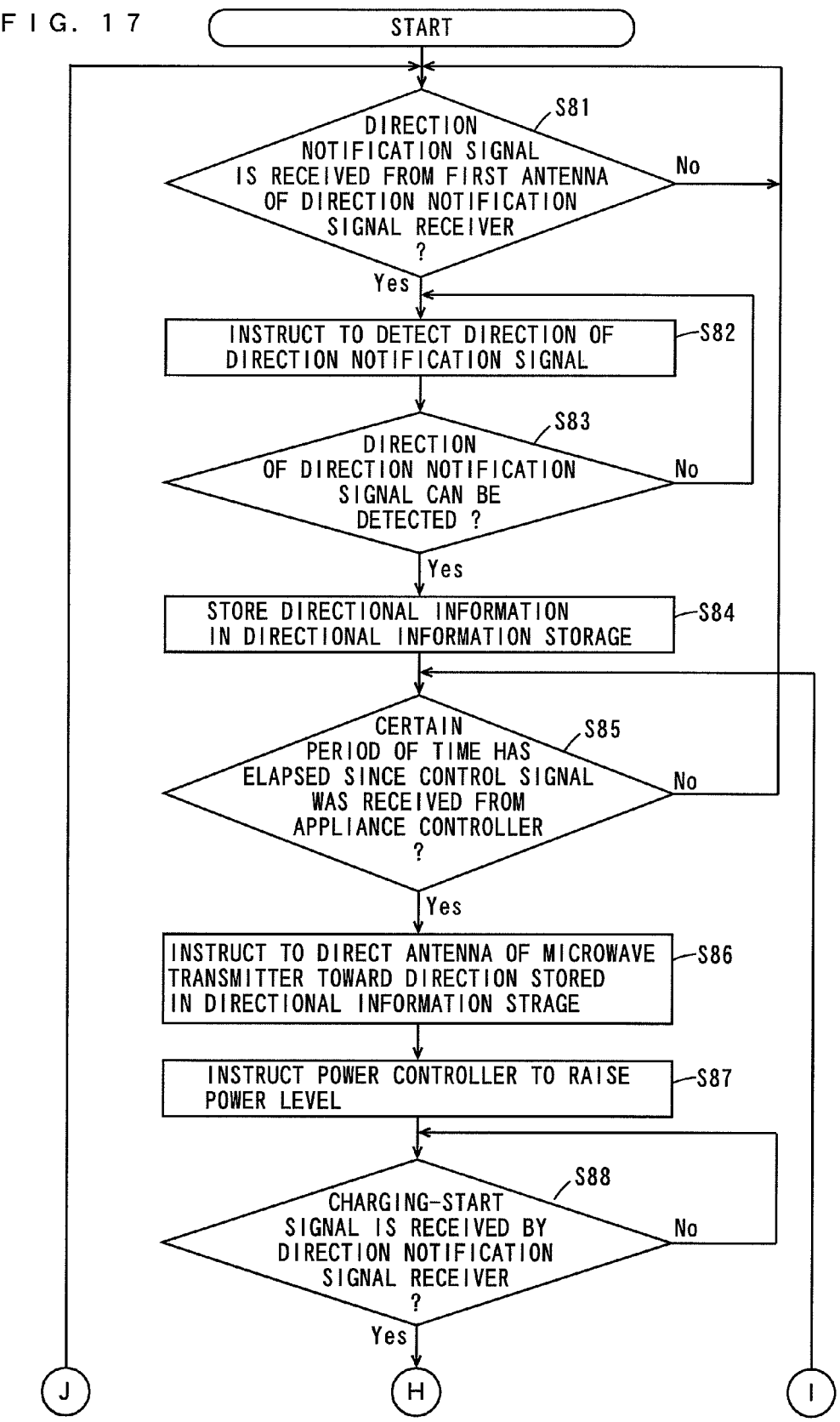
FIG. 17 is a flowchart showing processes by the direction retrieval unit of the television receiver.
Figure 18:
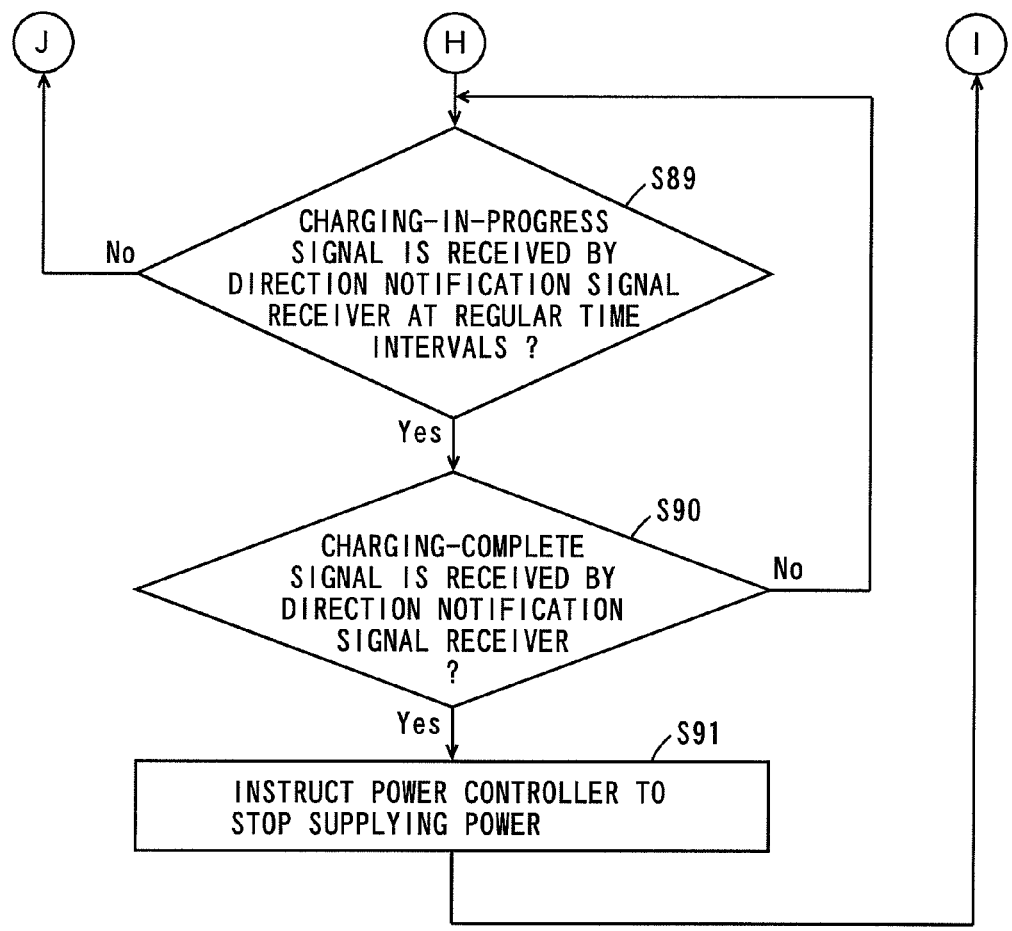
FIG. 18 is a flowchart showing processes by the direction retrieval unit of the television receiver.

FIGS. 17 and 18 are flowcharts showing processes of the direction retrieval unit 2 of the television receiver 200c.

As shown in FIG. 17, first, the direction retrieval unit 2 determines whether or not it receives from the first antenna of the direction notification signal receiver 30 the direction notification signal for detecting the direction in which the remote controller 100a exists (step S81). When the direction retrieval unit 2 does not receive the direction notification signal, it stands by until it receives the direction notification signal.

When the direction retrieval unit 2 receives the direction notification signal in the process of step S81, it instructs the receiving intensity judgment unit 57 of the second antenna A (FIG. 9) to detect the direction of the direction notification signal (step S82).

Then, the direction retrieval unit 2 determines whether or not the direction of the direction notification signal can be detected by judging the antenna unit 56 (FIG. 9) at which the receiving intensity of the direction notification signal from the direction notification signal transmitter 31 of the remote controller 100a is maximized (step S83). When the direction of the direction notification signal cannot be detected, the direction retrieval unit 2 returns to the process of step S82 to repeat the processes of steps S82, S83.

When the direction of the direction notification signal can be detected in the process of step S83, the direction is stored in the directional information storage 40 as the directional information (step S84).

Next, the direction retrieval unit 2 determines whether or not a certain period of time has elapsed since it received from the appliance controller 7 the control signal indicating that the user operated the appliance control content input unit 26 of the remote controller 10a, that is, whether or not a certain period of time has elapsed since the user operated the remote controller 100a (step S85). When a certain period of time has not elapsed since the above-mentioned control signal was received from the appliance controller 7, the direction retrieval unit 2 returns to the process of the step S81 to repeat the processes of steps S81 to S85.

When a certain period of time has elapsed since the above-mentioned control signal was received from the appliance controller 7 in the process of step S85, the direction retrieval unit 2 instructs the microwave transmitter 1 to direct the directional antenna toward a direction indicated by the foregoing directional information stored in the directional information storage 40 (step S86).

Next, the direction retrieval unit 2 instructs the power controller 3 to raise the power level of the microwaves (step S87).

The direction retrieval unit 2 subsequently determines whether or not the direction notification signal receiver 30 receives from the direction notification signal transmitter 31 of the remote controller 100a the charging-start signal indicating that the charging is started (step S88). When the direction notification signal receiver 30 does not receive the charging-start signal, the direction retrieval unit 2 stands by until the direction notification signal receiver 30 receives the charging-start signal.

When the direction notification signal receiver 30 receives the charging-start signal in the process of step S88, the direction retrieval unit 2 determines whether or not the direction notification signal receiver 30 receives at regular time intervals from the direction notification signal transmitter 31 of the remote controller 100a the charging-in-progress signals indicating that the charging is in progress (step S89 of FIG. 18). When the direction notification signal receiver 30 does not receive the charging-in-progress signals at regular time intervals, the direction retrieval unit 2 assumes that a position of the remote controller 100a has been changed, thus returning to the process of step S81 to repeat the processes of steps S81 to S89.

When the direction notification signal receiver 30 receives the charging-in-progress signals at regular time intervals in the process of step S89, the direction retrieval unit 2 determines whether or not the direction notification signal receiver 30 receives from the direction notification signal transmitter 31 of the remote controller 100a the charging-complete signal indicating that the charging is completed (step S90).

When the direction notification signal receiver 30 does not receive the charging-complete signal, the direction retrieval unit 2 returns to the process of step S89 to repeat the processes of steps S89, S90.

When the direction notification signal receiver 30 receives the charging-complete signal in the process of step S90, the direction retrieval unit 2 instructs the power controller 3 to stop supplying the power (step S91).

Then, the direction retrieval unit 2 returns to the process of step S85 to repeat the processes of steps S85 to S91.

Figure 19:
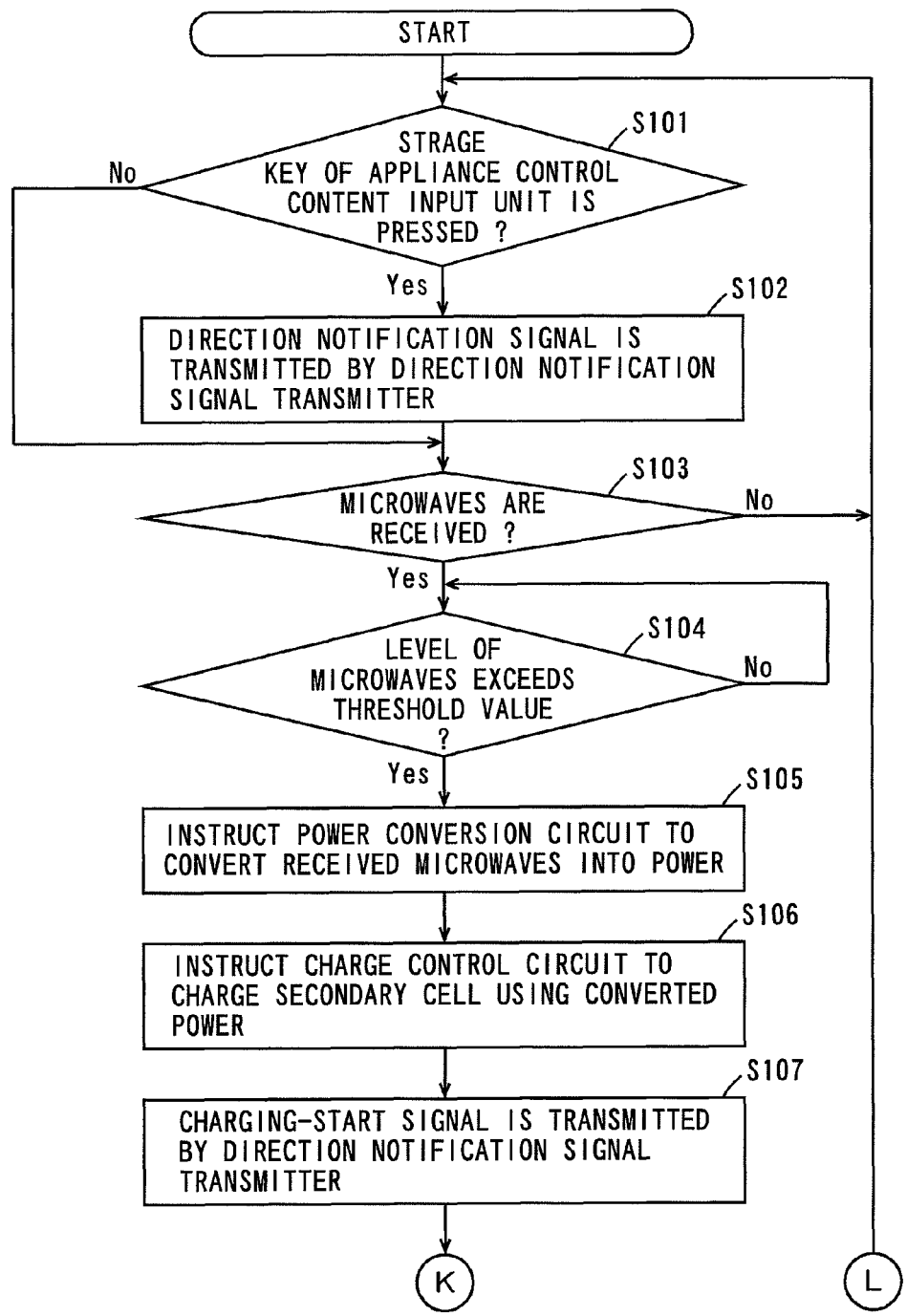
FIG. 19 is a flowchart showing processes by the microwave receiver of the remote controller.
Figure 20:
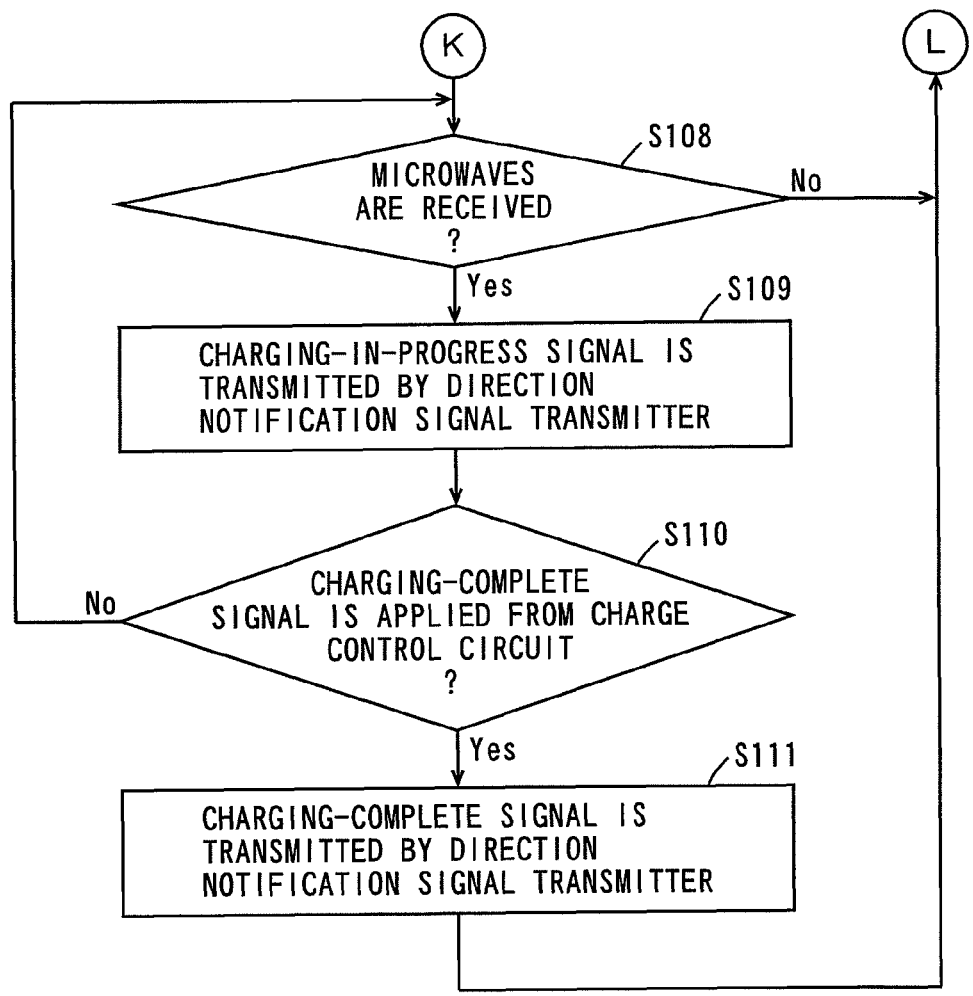
FIG. 20 is a flowchart showing processes by the microwave receiver of the remote controller.

FIGS. 19 and 20 are flowcharts showing the process of the microwave receiver 21 of the remote controller 100a.

As shown in FIG. 19, first, the microwave receiver 21 determines whether or not the storage key of the appliance control content input unit 26 is pressed by the user (step S101). When the storage key is not pressed by the user, the microwave receiver 21 proceeds to a process of step S103, described later.

When the storage key is pressed by the user in the process of step S101, the microwave receiver 21 causes the direction notification signal transmitter 31 to transmit the direction notification signal to the television receiver 200c (step S102).

Next, the microwave receiver 21 determines whether or not it receives the microwaves from the microwave transmitter 1 of the television receiver 200c (step S103). When the microwave receiver 21 does not receive the microwaves from the microwave transmitter 1, it returns to the process of step S101 to repeat the processes of steps S101 to S103.

When the microwave receiver 21 receives the microwaves from the microwave transmitter 1 in the process of step S103, it determines whether or not the power level of the received microwaves exceeds the predetermined threshold value (step S104). When the power level of the microwaves does not exceed the predetermined threshold value, the microwave receiver 21 stands by until the power level of the microwaves exceeds the predetermined threshold value.

When the power level of the microwaves exceeds the predetermined threshold value in the process of step S104, the microwave receiver 21 instructs the power conversion circuit 22 to convert the received microwaves into power (step S105).

Then, the microwave receiver 21 instructs the charge control circuit 23 to charge the secondary cell 24 using the converted power (step S106).

Next, the microwave receiver 21 causes the direction notification signal transmitter 31 to transmit the charging-start signal to the television receiver 200c (step S107).

The microwave receiver 21 subsequently determines whether or not it continuously receives the microwaves from the microwave transmitter 1 of the television receiver 200c (step S108 of FIG. 20). When the microwave receiver 21 does not continuously receive the microwaves, it returns to the process of step S101 to repeat the processes of steps S101 to S108.

When the microwave receiver 21 continuously receives the microwaves in the process of step S108, it causes the direction notification signal transmitter 31 to transmit the charging-in-progress signals to the television receiver 200c (step s109).

The microwave receiver 21 then determines whether or not the charging-complete signal is applied from the charge control circuit 23 (step S110). When the charging-complete signal is not applied from the charge control circuit 23, the microwave receiver 21 returns to the process of step S108 to repeat the processes of steps S108 to S110.

When the charging-complete signal is applied from the charge control circuit 23 in the process of step S110, the microwave receiver 21 causes the direction notification signal transmitter 31 to transmit the charging-complete signal to the television receiver 200c (step S111).

After this, the microwave receiver 21 returns to the process of step S101 to repeat the processes of steps S101 to S111.

(4-3) Effects of the Fourth Embodiment

As described above, the direction in which the remote controller 100a exists is detected, and the microwave transmitter 1 of the television receiver 200c transmits the power through the microwaves toward the detected direction while the secondary cell 24 of the remote controller 100a is charged in the fourth embodiment. This eliminates the necessity for users to place the remote controller 100a in the fixed position such as the holder (charging device). Accordingly, it does not take time and labor for users to charge the secondary cell 24 of the remote controller 100a. This causes the remote controller 100a to be easily used by users.

When the remote controller 100a is used for remotely operating an air conditioner, a control appliance in a factory or the like, for example, the remote controller 100a is set in a fixed position such as the holder in many cases.

In the fourth embodiment, the direction notification signal transmitted from the direction notification signal transmitter 31 is stored in the directional information storage 40 of the television receiver 200c as the directional information indicating the direction in which the remote controller 100a exists, thereby eliminating the process of again detecting the direction in which the remote controller 100a exists in the next power transmission.

(5) Other Embodiments

While microwaves (radio waves) are employed in the power transmission in the above-described embodiments because of its excellent conversion efficiency into power, the present invention is not limited to this. For example, various types of electromagnetic waves such as radio waves of a frequency band other than microwaves and light may be employed.

The notification signal and the direction notification signal may be microwaves, radio waves of the other frequency band, or light signals such as infrared signals.

While the television receiver 200, 200a, 200b, 200c is remotely operated by the remote controller 100, 100a as an example of the controlled appliance in the above-described embodiments, the present invention is applicable to a case where an air conditioner, various kinds of control appliances in a factory or the like is remotely operated as the controlled appliance.

The antenna of the microwave receiver 21 and the antenna of the notification signal transmitter 27 in the remote controller 100 may be provided in common, and the antenna of the microwave receiver 21 and the antenna of the direction notification signal transmitter 31 in the remote controller 100a may be provided in common.

While the charging is achieved by transmitting power to the remote controller 100, 100a that remotely operates various kinds of controlled appliances in the above-described embodiments, the present invention is not limited to this. For example, the remote controller 100, 10a may be a cellular phone. In this case, power is transmitted through the microwaves from a household charging device or the like, making it possible to charge the cellular phone.

While the microwave transmitter/receiver 32 is employed in the television receiver 200b according to the foregoing third embodiment instead of the microwave transmitter 1 and the direction notification signal receiver 30 of the television receiver 200a according to the second embodiment, the microwave transmitter/receiver 32 may be employed instead of the microwave transmitter 1 and the notification signal receiver 5 of the television receiver 200 according to the first embodiment. Similarly, while the directional information storage 40 is added to the television receiver 200a according to the second embodiment in the television receiver 200c according to the foregoing fourth embodiment, the directional information storage 40 may be added to the television receiver 200 according to the first embodiment.

(6) How to Implement Each Component

All of the structural elements in the above-described embodiments may be implemented by hardware such as an electronic circuit, or some of the structural elements may be implemented by hardware such as a CPU (central processing unit) and software such as a program.

(7) Correspondences Between Elements in the Claims and Parts in Embodiments

In the following paragraphs, non-limiting examples of correspondences between various elements recited in the claims below and those described above with respect to various preferred embodiments of the present invention are explained.

In the above-described embodiments, the television receivers 200, 200a, 200b, 200c are examples of an electronic appliance, the remote controllers 100, 100a are examples of a portable communication device, an infrared ray receiver 6 is an example of a first communication unit, the direction retrieval unit 2 is an example of a direction detector, the microwave transmitter 1 is an example of an electromagnetic wave transmitter, an infrared ray transmitter 25 is an example of a second communication unit, the microwave receiver 21 is an example of an electromagnetic wave receiver, the power conversion circuit 22 is an example of a power converter, the charge control circuit 23 is an example of a charger, the notification signal transmitter 27 and the direction notification signal transmitter 31 are examples of a notification signal transmitter, the notification signal receiver 5 and the direction notification signal receiver 30 are examples of a notification signal receiver, and the antenna 50 corresponds to a directional antenna.

In the above-described embodiments, the parabolic reflection plate 51, the driving mechanism 52a and the driving mechanism controller 52b, and the antenna unit group 52 and the antenna unit selector 54 are examples of a scanning unit, the antenna unit group 52 of the microwave transmitter/receiver 32 is an example of a common antenna, the appliance control content input unit 26 is an example of an operation signal generator and an instruction unit, an infrared ray transmitter 25 is an example of an operation signal transmitter, an infrared ray receiver 6 is an example of an operation signal receiver, and the directional information storage 40 is an example of a storage.

As each of various elements recited in the claims, various other elements having configurations or functions described in the claims can be also used.

INDUSTRIAL APPLICABILITY

The present invention is applicable to a portable communication device and the like that remotely operate various types of electronic appliances.

The invention claimed is:

1. A communication system comprising:
an electronic appliance; and
a portable communication device that communicates with said electronic appliance, wherein
said electronic appliance includes:
a first communication unit that communicates with said portable communication device,
a direction detector that detects a direction in which said portable communication device is located,
an electromagnetic wave transmitter that converts power supplied from a power supply into electromagnetic waves, increases a power level of the converted electromagnetic waves after the direction detector detects the direction in which said portable communication device is located, and transmits the electromagnetic wave having the increased power level in the direction detected by said direction detector, and
a functional unit that performs a television function distinct from a function performed by the electromagnetic wave transmitter in transmitting electromagnetic waves, the television function including receiving a broadcasting signal, selecting a channel, demodulating the broadcasting signal on the selected channel into a video signal and an audio signal, and outputting the demodulated video and audio signals,
said portable communication device includes:
a second communication unit that communicates with said electronic appliance,
a secondary cell that supplies power to said second communication unit,
an electromagnetic wave receiver that receives the electromagnetic waves transmitted by said electromagnetic wave transmitter,
a power converter that converts the electromagnetic waves received by said electromagnetic wave receiver into power, and
a charger that charges said secondary cell using the power converted by said power converter,
said second communication unit of said portable communication device includes:
an operation signal generator that generates an operation signal for performing selection of the channel of the television function of said electronic appliance based on an operation by a user, and
an operation signal transmitter that transmits, to said electronic appliance, the operation signal generated by said operation signal generator,
said first communication unit of said electronic appliance includes an operation signal receiver that receives the operation signal transmitted from said operation signal transmitter, and
said electromagnetic wave transmitter does not start transmission of the electromagnetic waves having the increased power level if a succeeding operation signal is received within a predetermined period of time after said operation signal receiver finishes receiving the operation signal, the predetermined period of time being set so as to be sufficient to give rise to an assumption that the user has finished using the portable communication device, and has placed the portable communication device at a position.

2. The communication system according to claim 1, wherein
said portable communication device further includes:
a notification signal transmitter that transmits, to said electronic appliance, when the electromagnetic waves are received by said electromagnetic wave receiver, a notification signal indicating that the electromagnetic waves are received;
said electronic appliance further includes:
a notification signal receiver that receives the notification signal transmitted by said notification signal transmitter,
said electromagnetic wave transmitter includes:
a directional antenna that radiates electromagnetic waves having directivity, and
a scanning unit that performs two-dimensional scanning of the electromagnetic waves, radiated by said directional antenna, having directivity, and
said direction detector controls said scanning unit to perform the two-dimensional scanning of the electromagnetic waves having directivity and stops the scanning by said scanning unit when the notification signal is received by said notification signal receiver.

3. The communication system according to claim 2, wherein said notification signal transmitter transmits, to said electronic appliance, a signal indicating that charging is completed when the charging by said charger is completed, and
said electromagnetic wave transmitter finishes transmission of the electromagnetic waves when the signal indicating that the charging is completed is received by said notification signal receiver.

4. The communication system according to claim 3, wherein
said notification signal transmitter transmits, to said electronic appliance, a signal indicating that the charging is in progress when the charging by said charger is in progress, and
said direction detector again detects the direction in which said portable communication device is located when the signal indicating that the charging is in progress is not received by said notification signal receiver before the signal indicating that the charging is completed is received by said notification signal receiver.

5. The communication system according to claim 2, wherein said electromagnetic wave transmitter and said notification signal receiver include a common antenna.

6. The communication apparatus according to claim 2, wherein the scanning unit performs two-dimensional scanning of the electromagnetic wave with a low power level, radiated by said directional antenna, and
the electromagnetic wave radiated from the directional antenna is increased after the notification signal receiver received the notification signal.

7. The communication system according to claim 1, wherein
said portable communication device further includes:
a notification signal transmitter that transmits a notification signal for detecting the direction in which the portable communication device is located,
said electronic appliance further includes:
a notification signal receiver that receives the notification signal transmitted by said notification signal transmitter,
said electromagnetic wave transmitter includes:
a directional antenna that radiates electromagnetic waves having directivity, and
a scanning unit that performs two-dimensional scanning of the electromagnetic waves, radiated by said directional antenna, having directivity, and
said direction detector detects the direction in which said portable communication device is located based on the notification signal received by said notification signal receiver and controls said scanning unit to direct the electromagnetic waves, radiated by said directional antenna, having directivity to the detected direction.

8. The communication system according to claim 1, wherein said electronic appliance further includes a data storage that stores the direction, detected by said direction detector, in which said portable communication device is located, and said electromagnetic wave transmitter transmits the electromagnetic waves in the direction, stored in said data storage, in which said portable communication device is located.

9. The communication system according to claim 8, wherein said portable communication device further includes an instruction unit that instructs storing of the direction in which the portable communication device is located, said second communication unit transmits, to said electronic appliance, an instruction signal indicating an instruction by said instruction unit, and said data storage stores, when said instruction signal is received by said first communication unit, the direction, detected by said direction detector, in which said portable communication device is located.

10. The communication system according to claim 1, wherein said electromagnetic waves have a frequency of 1 GHz to 30 GHz and a wavelength of 1 cm to 10 cm.

11. The communication apparatus according to claim 1, wherein the direction detector determines whether or not the predetermined period of time has elapsed since said operation signal receiver finished receiving the operation signal, and instructs the electromagnetic wave transmitter to start transmission of the electromagnetic waves when the direction detector determines that the predetermined period of time has elapsed.

* * * * *